US009189716B2

(12) United States Patent
Takahama et al.

(10) Patent No.: US 9,189,716 B2
(45) Date of Patent: Nov. 17, 2015

(54) GENERATING A THRESHOLD MATRIX TO BE COMPARED WITH AN ORIGINAL IMAGE FOR PERFORMING HALFTONING OF THE ORIGINAL IMAGE

(71) Applicant: DAINIPPON SCREEN MFG. CO., LTD., Kyoto-shi, Kyoto (JP)

(72) Inventors: Ikuhiko Takahama, Kyoto (JP); Hiroshi Asai, Kyoto (JP); Yoshikazu Ichioka, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 14/227,880

(22) Filed: Mar. 27, 2014

(65) Prior Publication Data

US 2014/0293298 A1 Oct. 2, 2014

(30) Foreign Application Priority Data

Mar. 28, 2013 (JP) ................ P2013-069169

(51) Int. Cl.
*G06K 15/02* (2006.01)
*H04N 1/405* (2006.01)
*G06K 15/10* (2006.01)

(52) U.S. Cl.
CPC .......... *G06K 15/1881* (2013.01); *G06K 15/102* (2013.01); *H04N 1/4051* (2013.01)

(58) Field of Classification Search
CPC  G06K 15/1881; G06K 15/102; H04N 1/4051
USPC ........................................ 358/1.8
See application file for complete search history.

(56) References Cited

U.S. PATENT DOCUMENTS

| 4,664,541 A * | 5/1987 | Stefani ................ 400/124.07 |
| 2004/0100658 A1* | 5/2004 | Kanda et al. ............. 358/1.18 |
| 2008/0291500 A1 | 11/2008 | Asai |

FOREIGN PATENT DOCUMENTS

| EP | 0 805 586 A2 | 11/1997 |
| EP | 1 995 945 A1 | 11/2008 |

(Continued)

OTHER PUBLICATIONS

Threshold matrix for digital halftoning by genetic algorithm optimization. Proc. SPIE 3522, Intelligent Robots and Computer Vision XVII: Algorithms, Techniques, and Active Vision, 204 (Oct. 6, 1998); doi:10.1117/12.325765 to Alander et al.*

(Continued)

*Primary Examiner* — Eric A Rust
(74) *Attorney, Agent, or Firm* — McDermott Will & Emery LLP

(57) ABSTRACT

An image obtained by shrinking an original image in a row direction is halftoned, and this halftone dot image is enlarged in the row direction and recorded at double speed. In order to determine a threshold value of a threshold matrix used for halftoning an image, prepared is a matrix space in accordance with writing positions used for actual recording of an image. In the matrix space, writing elements are set alternately with non-writing elements both in the row direction and in a column direction. In the matrix space, turn-on numbers are allocated to all the writing elements in avoidance of the non-writing elements. Then, in accordance with the turn-on numbers, respective threshold values for the writing elements are determined. By shrinking the threshold matrix in the row direction with omission of the non-writing elements, a threshold matrix for double speed is obtained.

18 Claims, 22 Drawing Sheets

(56) References Cited

FOREIGN PATENT DOCUMENTS

| JP | 2006-094566 A | 4/2006 |
| JP | 2008-294702 A | 12/2008 |
| JP | 2009-061727 A | 3/2009 |

OTHER PUBLICATIONS

European Search Report issued in European Application No. 14153842.1 dated Jun. 26, 2014.

* cited by examiner

GENERATING A THRESHOLD MATRIX TO BE COMPARED WITH AN ORIGINAL IMAGE FOR PERFORMING HALFTONING OF THE ORIGINAL IMAGE

CROSS REFERENCE TO RELATED APPLICATIONS

This application claims the benefit of priority under 35 U.S.C., Section 119 to Japanese Patent Application No. P2013-069169 dated Mar. 28, 2013. The subject matter of which is incorporated by reference in its entirety.

TECHNICAL FIELD

The present invention relates to a technique for generating a threshold matrix to be compared with an original image of multi-gradation in performing halftoning of the original image.

BACKGROUND ART

The FM (Frequency Modulated) screening is used in, for example, inkjet-type image recording, and gradation (tone) is expressed by changing the density of distribution of microdots, each of which is a minimum pixel unit, being irregularly arranged. The arrangement of the microdots is performed in accordance with halftone dot image data which is generated from an original image in advance. In the inkjet-type image recording, by ejecting ink onto writing positions on a recording object, the microdots are formed at the writing positions.

In order to halftone an original image of multi-gradation. i.e. of continuous tone, a threshold matrix in which a plurality of elements are arranged both in a row direction and in a column direction and respective threshold values are given to the elements is generated in advance and prepared, and the original image is compared with the threshold matrix. As a technique for generating a threshold matrix, for example, in a halftone screen generation method disclosed in Japanese Patent Application Laid Open Gazette No. 2006-94566 (Document 1), a weighting filter is operated around a position of a determined threshold value and a position of a next threshold value is sequentially determined on the basis of a distribution of cumulative weighting values.

Further, in a threshold matrix generation method disclosed in Japanese Patent Application Laid-Open No. 2008-294702 (Document 2), in a matrix area, a plurality of linear areas extending in a direction inclined with respect to a row direction and a column direction are set in advance. The plurality of linear areas are further allocated alternately to a first element group and a second element group. In each of the element groups, after one element is specified, by repeating a process of specifying an element which is farthest away from specified elements, the order of illuminating (turning on) dots is determined and a threshold value of each element is determined in accordance with this order.

On the other hand. Japanese Patent Application Laid-Open No. 2009-61727 (Document 3) discloses a technique to perform printing at double speed by using an image shrunken to a half in a width direction which is a row direction of a pixel array. In double-speed writing, by extending the shrunken image in the width direction and writing dots in a checkerboard-like manner both in the row direction and in a column direction among writing positions in normal writing, the image is recorded with suppression of deterioration in the quality of the image.

In a case where an image is recorded by using the technique disclosed in Document 3, when the image is recorded by performing halftoning on the image shrunken to a half in the width direction and extending the thus-obtained halftone dot image in the width direction, unintended deviation of writing dots sometimes occurs.

SUMMARY OF INVENTION

It is an object of the present invention to prevent deviation of dots to be written and achieve an excellent discrete state of dots even in high-speed image recording.

The present invention is intended for a threshold matrix generation method of generating a threshold matrix to be compared with an original image of multi-gradation in performing halftoning of the original image in an image recording apparatus. The image recording apparatus is capable of recording an image at single speed and at N-fold speed where N is an integer not less than 2.

The threshold matrix generation method according to one preferred embodiment of the present invention includes a) preparing a matrix space which is a set of matrix elements arranged both in a column direction which corresponds to a recording direction in the image recording apparatus and in a row direction perpendicular to the column direction, b) setting writing elements which are matrix elements corresponding to writing positions on a recording object so that one writing element is positioned at intervals of (N−1) matrix elements in the column direction and one writing element is positioned at intervals of (N−1) matrix elements or two writing elements are positioned at intervals of (2N−2) matrix elements in the row direction and setting the other matrix elements as non-writing elements in the operation a) or after the operation a), c) giving the first turn-on number to one writing element, being thereafter changed to a determined element, and then repeating a process of specifying a writing element which is farthest away from all determined elements and giving a next turn-on number to the writing element, being thereafter changed to a determined element, in consideration of repetitive application of the threshold matrix in performing halftoning of an original image, to thereby allocate turn-on numbers to all writing elements, and d) obtaining a threshold matrix for N-fold speed by determining a threshold value of each writing element in accordance with the turn-on number.

By the present invention, it is possible to achieve an excellent discrete state of written dots even in high-speed image recording.

Preferably, the N is 2.

In a case of obtaining a threshold matrix for single speed, for example, the threshold matrix generation method further includes, after the operation c), e) giving a turn-on number next to a turn-on number of the last writing element to one non-writing element, being thereafter changed to a determined element, and then repeating a process of specifying a non-writing element which is farthest away from all determined elements and giving a next turn-on number to the non-writing element, being thereafter changed to a determined element, in consideration of repetitive application of the threshold matrix in performing halftoning of the original image, to thereby allocate turn-on numbers also to all non-writing elements, and f) obtaining a threshold matrix for single speed by determining a threshold value of each writing element and each non-writing element in accordance with the turn-on number.

Preferably, the threshold matrix generation method further includes shrinking the threshold matrix for N-fold speed in the row direction by omitting the non-writing elements after the operation d).

In contrast to this, there may be another case where the matrix space is a virtual matrix space which is virtually set, a matrix space which is the virtual matrix space shrunken in the row direction by omitting the non-writing elements is a real matrix space to be set in a memory device, and the operation c) is executed with conversion of coordinates of the real matrix space into coordinates of the virtual matrix space.

The present invention is also intended for an image data generation method of generating image data by using the threshold matrix.

The present invention is still also intended for an image recording apparatus for recording an image by performing output control of a plurality of dot output elements on the basis of halftone dot image data.

In the image recording apparatus, for example, in recording an image at N-fold speed, the non-writing elements correspond to non-writable positions on the recording object. In the image recording apparatus, preferably, the head part passes only once over each position on the recording object, to thereby record an image.

The present invention is further intended for a non-transitory computer-readable recording medium recorded therein a program to cause a computer to generate a threshold matrix.

These and other objects, features, aspects and advantages of the present invention will become more apparent from the following detailed description of the present invention when taken in conjunction with the accompanying drawings.

BRIEF DESCRIPTION OF DRAWINGS

FIG. 13 is a view showing an image obtained by changing a size of the original image in a width direction;

FIGS. 14 and 15 are views each showing writing positions of dots on recording paper;

DESCRIPTION OF EMBODIMENTS

Figure 1:
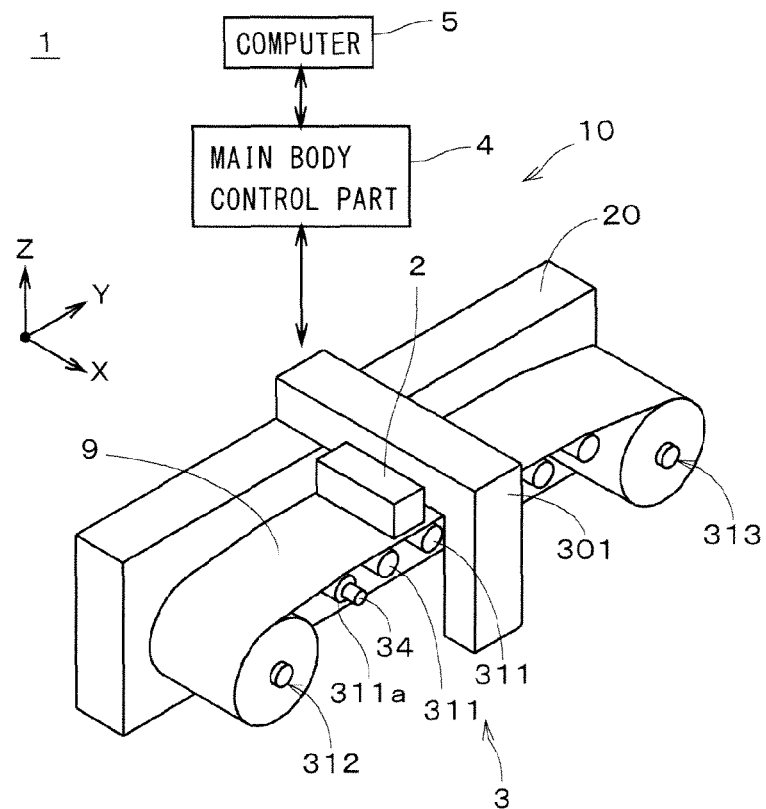
FIG. 1 is a view showing an image recording apparatus.

FIG. 1 is a view showing a configuration of an image recording apparatus 1 in accordance with one preferred embodiment of the present invention. The image recording apparatus 1 is an apparatus for performing inkjet-type color printing on a recording object such as web-like printing paper or film (the recording object is not limited to paper, but hereinafter referred to as "recording paper 9"). The image recording apparatus 1 may perform monochrome printing. In the image recording apparatus 1, for example, images are recorded onto a plurality of areas on the recording paper 9, which correspond to a plurality of pages.

The image recording apparatus 1 shown in FIG. 1 includes a main body 10 for recording an image onto the recording paper 9 while transferring the recording paper 9 in the (−Y) direction of FIG. 1 (hereinafter, referred to also as a "transfer direction") and a computer 5 connected to the main body 10. The main body 10 includes an ejection part 2 for ejecting fine droplets of ink toward the recording paper 9, a moving mechanism 3 for moving the recording paper 9 below the ejection part 2 toward the (−Y) direction of FIG. 1, and a main body control part 4 connected to the ejection part 2 and the moving mechanism 3.

In the moving mechanism 3, a plurality of rollers 311 each elongated in a width direction are arranged in the transfer direction. On the (+Y) side of the plurality of rollers 311, provided is a feeding part 313 for holding a roll of recording paper 9 before recording and feeding the recording paper 9 from the roll in the transfer direction. On the (−Y) side of the plurality of rollers 311, provided is a winding part 312 for winding portions of the recording paper 9, on which recording has been performed, in a roll state and holding the wound recording paper 9. In the following description, the recording paper 9 which is simply described thus refers to the recording paper 9 being transferred (in other words, the recording paper 9 on the plurality of rollers 311). An encoder 34 is provided in one roller 311a in the moving mechanism 3, and a movement speed of the recording paper 9 in the transfer direction is acquired on the basis of pulse signals from the encoder 34. The moving mechanism 3 is supported by a side wall portion 20.

The ejection part 2 is attached to a frame 301 provided across the recording paper 9 in the width direction. The ejection part 2 includes a plurality of (in the present preferred embodiment, four) head parts. The plurality of head parts eject inks of colors. i.e., C (cyan). M (magenta), Y (yellow), and K (black), respectively, and are arranged in the Y direction.

Figure 2:
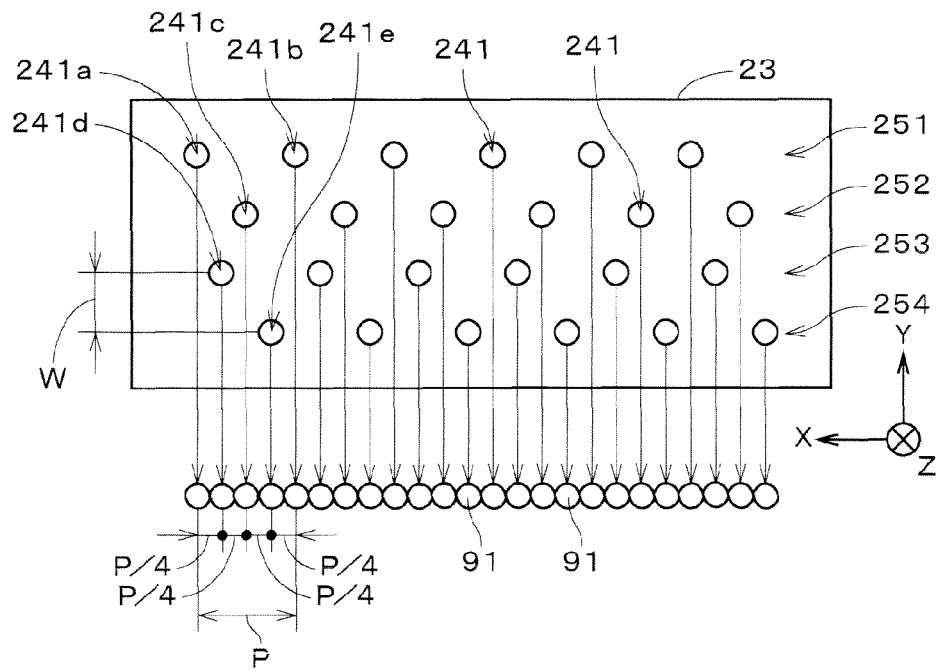
FIG. 2 is a view showing an arrangement of ejection ports included in a head part.

An upper stage of FIG. 2 shows ejection ports 241 included in one head part 23, and a lower stage of FIG. 2 shows dots 91 formed on the recording paper 9 by the ejection ports 241 (dots are virtually shown, however, even in a case where no dot is actually formed). Further, in the upper stage of FIG. 2, a scan direction of the recording paper 9 with respect to the ejection part 2 (i.e., the Y direction, and the direction is also a recording direction) is vertically shown, and the number of ejection ports 241 which are shown is less than an actual number.

On a bottom surface of each head part 23, provided are a plurality of (in the present preferred embodiment, four) ejection port rows 251, 252, 253, and 254, and each of the ejection port rows 251 to 254 has a plurality of ejection ports 241 which are arranged at a regular pitch P (hereinafter, referred to as an "ejection port pitch P") in a direction perpendicular to the scan direction and along the recording paper 9 (i.e., the X direction of FIG. 1, and the direction is hereinafter referred to also as a "width direction" since it is a direction corresponding to the width of the recording paper 9). Further, the plurality of ejection port rows 251 to 254 are arranged at a regular interval (the interval indicated by the arrow W in the upper stage of FIG. 2, and hereinafter referred to as a "column interval") in the scan direction (Y direction). Hereinafter, the four ejection port rows 251 to 254 shown in the upper stage of FIG. 2 are also referred to as a first ejection port row to a fourth ejection port row from the (+Y) side toward the (−Y) direction.

Further, in the head part 23, with respect only to the width direction, between two ejection ports which are adjacent to each other in the width direction in one ejection port row, one ejection port of each of the other three ejection port rows is disposed. For example, in the first ejection port row 251 positioned on the most (−Y) side, one ejection port 241c included in the second ejection port row 252 positioned second from the (+Y) side is disposed at the center between the ejection port represented by the reference sign 241a and the ejection port represented by the reference sign 241b in the upper stage of FIG. 2, one ejection port 241d included in the third ejection port row 253 positioned third from the (+Y) side is disposed at the center between the ejection port 241a and the ejection port 241c, and, one ejection port 241e included in the fourth ejection port row 254 positioned on the most (−Y) side is disposed at the center between the ejection port 241c and the ejection port 241b.

Thus, in the head part 23, the plurality of ejection port rows 251 to 254 are arranged in the scan direction with the positions of the ejection ports 241 shifted in the width direction, and a lot of ejection ports 241 are thereby arranged at a regular pitch in the width direction (exactly, at a pitch which is a fourth of the ejection port pitch P in each of the ejection port rows 251 to 254). Therefore, as shown in the lower stage of FIG. 2, a plurality of dots 91 aligned in the width direction can be formed at all the positions on the recording paper 9 in the scan direction.

In the head part 23, a piezoelectric element is provided in each of the ejection ports 241, and by driving the piezoelectric element, droplets of ink are ejected from each of the ejection ports 241 toward the recording paper 9. In an actual case, the plurality of ejection ports 241 are arranged across the width of a recording area on the recording paper 9 in the width direction, and high-speed image recording can be thereby performed by one pass in the image recording apparatus 1. Though the head part 23 in which the plurality of ejection port rows 251 to 254 are formed as one unit is provided in the present preferred embodiment, a head part 23 may be constructed by arranging head elements both in the X direction and in the Y direction. In each of the head elements, one or several ejection port rows are formed as one unit.

Figure 3:
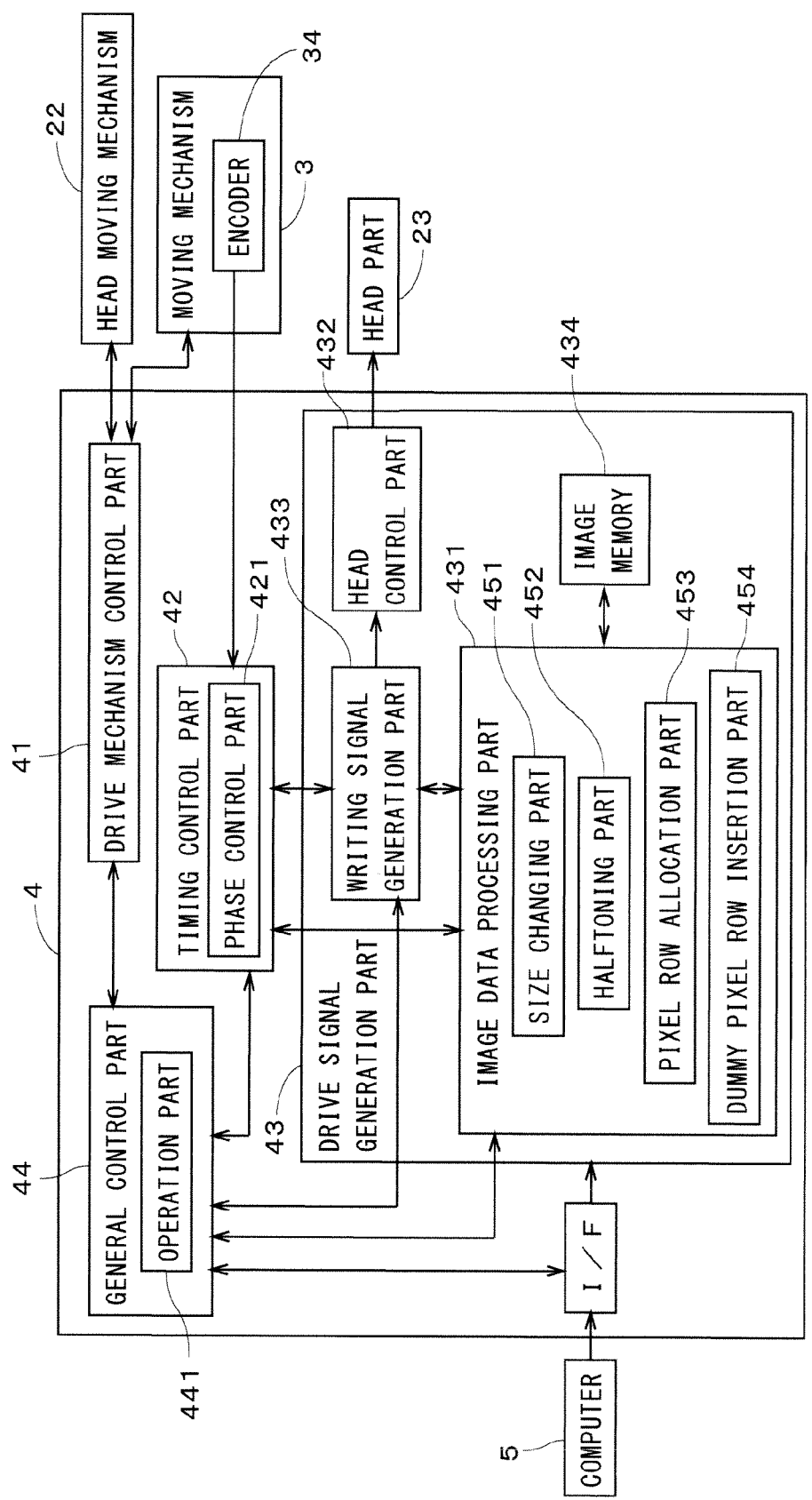
FIG. 3 is a block diagram showing a functional constitution of a main body control part.

FIG. 3 is a block diagram showing a functional constitution of the main body control part 4. The main body control part 4 includes a drive mechanism control part 41 for performing drive control of a head moving mechanism 22 and the moving mechanism 3, a timing control part 42 for receiving an encoder signal from the encoder 34 of the moving mechanism 3 and controlling timing of ejection of droplets from the ejection ports 241 in the head part 23, a drive signal generation part 43 connected to the computer 5 through an interface (I/F) and giving the head part 23 a signal for instructing the head part 23 to perform operations for ejection of droplets, and a general control part 44 for performing general control of the main body control part 4. Though only one head part 23 is shown in FIG. 3, for convenience of illustration, the drive signal generation part 43 actually gives the signals to the plurality of head parts 23. Hereinafter, though explanation will be made with respect to one head part 23, the same operation is performed on the other head parts 23.

The drive signal generation part 43 has an image data processing part 431 for generating processed image data in accordance with an actual image recording operation from data of the original image (hereinafter, referred to as "original image data") to be recorded, which is inputted from the computer 5, a head control part 432 connected to the head parts 23, a writing signal generation part 433 for generating writing signals for the head parts 23 on the basis of the processed image data inputted from the image data processing part 431, and an image memory 434.

In a basic operation in the drive signal generation part 43, in the head control part 432, values (values of the writing signals) for instructing whether or not to eject droplets on the basis of the processed image data are inputted to registers provided corresponding to the plurality of ejection ports 241 of the head part 23, respectively, and a set of signals in accordance with the values of the registers, for the plurality of ejection ports 241 in each of the ejection port rows 251 to 254, are inputted to the head part 23 as drive signals. With this operation, ejection ports 241 eject droplets when values for instructing ejection of droplets (writing) are inputted in the corresponding registers in each of the ejection port rows 251 to 254, and ejection ports 241 perform operations in non-writing (for example, oscillation which is minute enough not to an eject droplet from the ejection port 241) when values for instructing no-writing are inputted.

Thus, by inputting the drive signals from the drive signal generation part 43 on the basis of the processed image data, a drive control to cause each ejection port 241 to perform an ejection operation. i.e. ejection of a droplet or the operation in non-writing, is performed concurrently in each of the ejection port rows 251 to 254 of the head part 23. Respective functions of the general control part 44 and the timing control part 42 will be described in detail in the following description of the image recording operation.

In the head part 23 used in the present preferred embodiment, like a general inkjet head, a cycle of inputting the drive signals, as a rated value for achieving high-precision image recording, (hereinafter, the rated cycle is referred to as a "basic cycle") is determined, and in an actual image recording operation, the ejection operations are repeated at the basic cycle (practically, however, difference within ±several percent (%) is allowed) in each of the ejection port rows 251 to 254.

Figure 4:
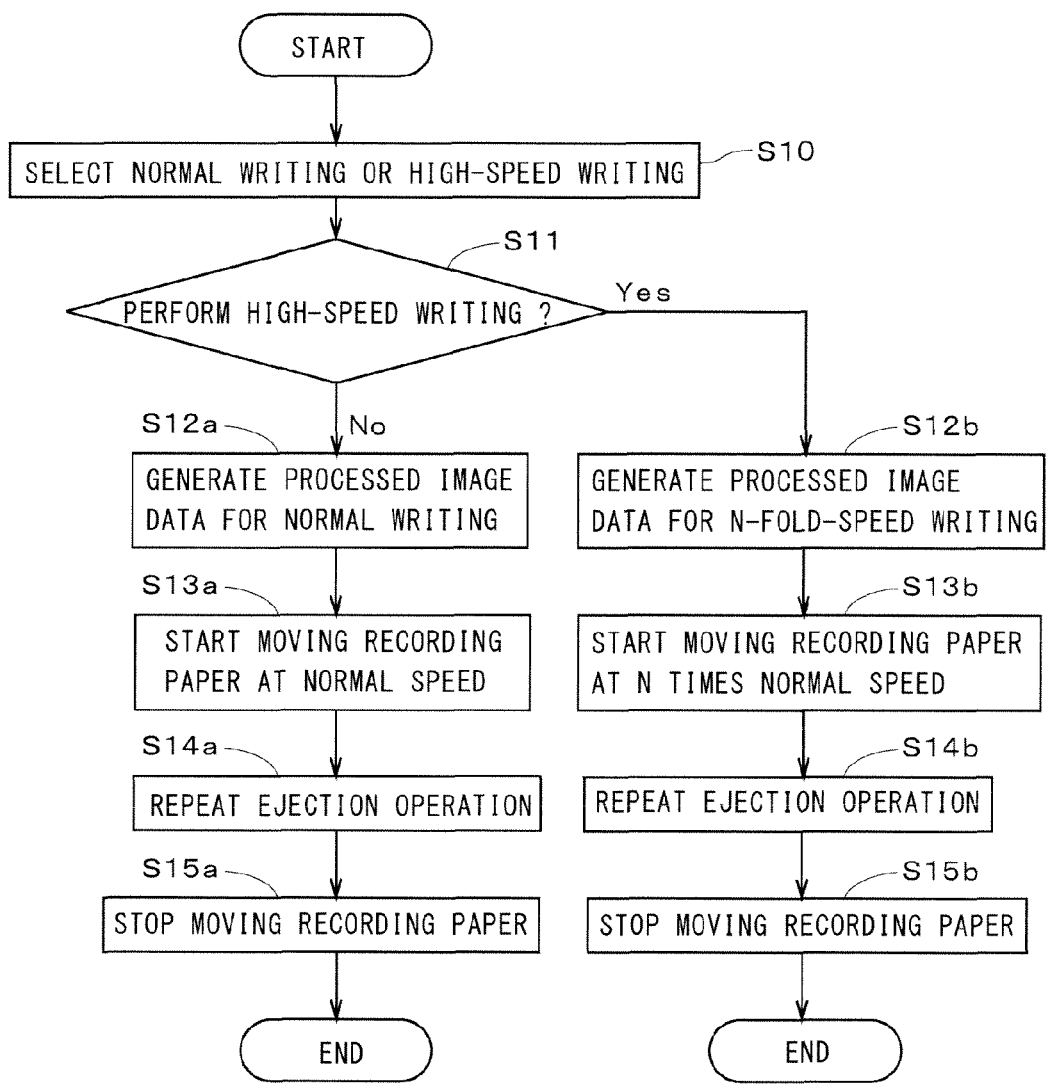
FIG. 4 is a flowchart showing a flow of an image recording operation.

FIG. 4 is a flowchart showing a flow of an image recording operation in the image recording apparatus 1. In the following description, though recording of dots is referred to as "writing" and it is described that "an image is recorded" by writing a plurality of dots, it is not necessary to strictly distinguish between "writing" and "recording". In the image recording apparatus 1, normal writing and high-speed writing in which writing is performed at speed higher than that of the normal writing can be selected, and herein a user selects normal writing and an input indicating normal writing is received by the computer 5 (Step S10). The original image data is received by the computer 5 and stored in the image memory 434 in advance. When it is confirmed that normal writing is selected (Step S11), the original image data is read out from the image memory 434, and a halftoning part 452 in the image data processing part 431 generates halftone dot image data representing a halftone dot image in which an original image of multi-gradation is halftoned. Further, the image data processing part 431 generates processed image data from the halftone dot image data in accordance with an actual image recording operation (Step S12a).

Figure 5:
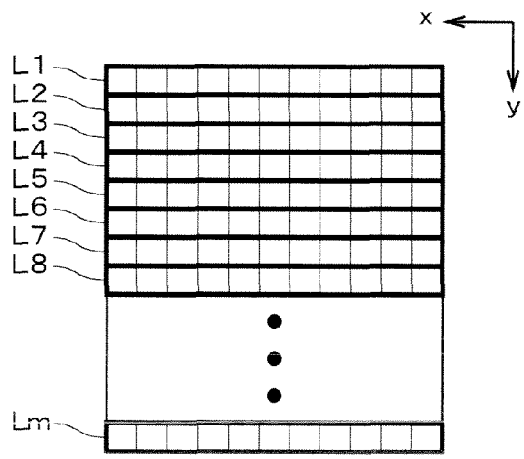
FIG. 5 is a view showing an original image.

FIG. 5 is a view abstractly showing the halftone dot image. In the halftone dot image shown in FIG. 5, assuming that a set of pixels aligned in a lateral direction corresponding to the width direction (indicated as an x direction in FIG. 5) is defined as a pixel row, the pixel rows are represented by reference signs L1, L2, L3, . . . , and Lm (m is a multiple of 4, for convenience of explanation) sequentially from the (−y) side toward the (+y) side in a longitudinal direction corresponding to the y direction (indicated as a y direction in FIG. 5).

As described earlier, in the head part 23, at each position on the recording paper 9 in the scan direction, a plurality of dots aligned in the width direction can be formed (see the lower stage of FIG. 2) by the four ejection port rows 251 to 254, and the number of pixels in each pixel row of the halftone dot image is not larger than the number of ejection ports 241 included in the ejection port rows 251 to 254. In the image recording apparatus 1, from the (+X) side toward the (−X) direction in the width direction, the plurality of ejection ports 241 are arranged in the order of one ejection port 241 in the first ejection port row 251, one ejection port 241 in the third ejection port row 253, one ejection port 241 in the second ejection port row 252, and one ejection port 241 in the fourth ejection port row 254 (see the upper stage of FIG. 2).

Therefore, in the image data processing part 431, a pixel row allocation part 453 sequentially allocates the plurality of pixels in the pixel rows L1. L2, L3, . . . , and Lm from the (+x) side toward the (−x) direction to the four groups corresponding to the first ejection port row 251, the third ejection port row 253, the second ejection part1 252, and the fourth ejection port row 254, respectively. Further, a dummy pixel row insertion part 454 inserts dummy data into each group in accordance with the positional differences of the ejection port rows 251 to 254 in the scan direction. With the above operation, the processed image data which is a set of these groups is generated.

After the processed image data is generated (or part of the processed image data is generated), the drive mechanism control part 41 drives the moving mechanism 3 to start moving the recording paper 9 (Step S13a), and the recording paper 9 is thereby moved at a constant speed (normal speed explained later). Then, concurrently with relative movement of the ejection part 2 with respect to the recording paper 9, the timing control part 42 repeatedly outputs an ejection timing signal at the basic cycle, and every time when an ejection timing signal is inputted, the head control part 432 outputs the drive signals to the head part 23 and the ejection operations are repeatedly performed (in other words, the normal writing is performed) (Step S14a).

Thus, the drive mechanism control part 41, the timing control part 42, the head control part 432, and the general control part 44 serve as a control part for performing output control on the head part 23 including a plurality of dot output elements on the basis of the processed halftone dot image data for the head part 23 concurrently with the relative movement of a plurality of writing positions on the recording paper 9 with respect to the recording paper 9.

Herein, in the head part 23 shown in FIG. 2, the movement speed of the recording paper 9 (hereinafter, referred to as "normal speed", referring to single speed) where a column interval W which is a center distance between two ejection ports 241 which are adjacent to each other in the scan direction is an integral multiple of (in the present preferred embodiment, eight times) the distance at which the head part 23 relatively moves with respect to the recording paper 9 during the basic cycle is determined in advance, and in the normal writing, the ejection operations of all the ejection ports 241 in the four ejection port rows 251 to 254 are performed at the basic cycle at the same time while the recording paper 9 is continuously moved at this normal speed in the scan direction. Assuming that a virtual dot formation operation is performed even when the operation in non-writing is performed, with the above operation, dot formation operations for forming a plurality of dots aligned in the width direction are performed by the four ejection port rows 251 to 254.

A resolution of the image in the scan direction (in other words, the number of dots per unit distance, and represented by, for example, "dpi (dot per inch)), which is recorded by performing the ejection operations in the four ejection port rows 251 to 254 at the basic cycle at the same time while the recording paper 9 is moved at the normal speed in the scan direction, is determined in advance as a rated normal resolution of the head part 23. Further, a resolution of the recorded image in the width direction takes a value which corresponds to a reciprocal of a pitch (i.e., a distance between dots in the width direction) which is a fourth of the ejection port pitch P in each of the ejection port rows 251 to 254.

Then, after an entire object image is recorded on the recording paper 9, the movement of the recording paper 9 is stopped and the normal writing in the image recording apparatus 1 is completed (Step S15a).

Next, explanation will be made on a case where high-speed writing is selected in Step S10 of FIG. 4. In the image recording apparatus 1, while the recording paper 9 is moved, recording can be performed at a speed obtained by multiplying the normal speed by a submultiple of the number of the ejection port rows 251 to 254 in the head part 23. When the high-speed writing is selected in Step S10 of FIG. 4, the user further selects one of the submultiples (except "1") of the number of the ejection port rows 251 to 254 as a multiple speed value. An input indicating the multiple speed value which is selected (hereinafter, referred to as a "selected multiple speed value") is received by the computer 5, and the selected multiple speed value is inputted to the general control part 44 of the main body control part 4 shown in FIG. 3. Herein, it is assumed that "2" which is one of the submultiples of the number of the ejection port rows 251 to 254. i.e. 4, is selected as the selected multiple speed value.

When it is confirmed that high-speed writing with selected multiple speed value of "2" (hereinafter, also referred to as "double-speed writing") is selected (Step S11), in an operation part 441 of the general control part 44, each parameter value corresponding to the selected multiple speed value is inputted to the drive mechanism control part 41, the timing control part 42, and the drive signal generation part 43. Subsequently, the image data processing part 431 generates the processed image data for double-speed writing from the original image (Step S12b). In Step S12b (and Step S13b) in FIG. 4, a generalized operation with the selected multiple speed value of "N" is shown.

In the size changing part 451 shown in FIG. 3, for example, by obtaining an average of pixel values of the two adjacent pixels among the plurality of pixels aligned in a direction (the x direction in FIG. 5) corresponding to the width direction of the original image (or by extracting every other pixel), a size (the number of pixels) of the original image in the x direction is changed to a half in accordance with the selected multiple speed value (to a size obtained by dividing the original size by the selected multiple speed value).

After that, by extracting every other pixel from the (+x) side toward the (−x) direction in each pixel row (the pixel row after the change in the number of pixels), two pixel rows, i.e., the extracted pixel row and the other pixel row, are generated. One pixel row consists of only odd-numberth pixels in the pixel row after the change in the number of pixels, and the other pixel row consists of only even-numberth pixels. In the following description, the two pixel rows generated from each of the pixel rows L1, L2, L3, ..., and Lm are represented by reference signs La1, La2, La3, ..., and Lam and Lb1, Lb2, Lb3, ..., and Lbm (the pixel rows La1, La2. La3, ..., and Lam include pixels on the most (+x) side in the pixel rows after the change in the number of pixels).

Figure 6:
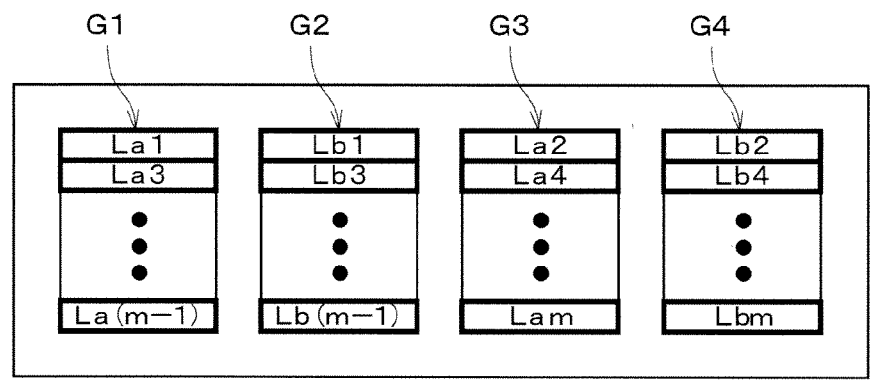
FIG. 6 is a view used for explaining an operation of allocating pixel rows to pixel row groups.

Subsequently, as shown in FIG. 6, the pixel rows La1, Lb1, La2, Lb2, La3, Lb3, ..., and Lam, Lbm (represented by rectangles with any one of reference signs La1, Lb1, La2, Lb2, La3, Lb3, ..., and Lam, Lbm in FIG. 6) are sequentially allocated to four groups the number of which is the same as the number of the ejection port rows 251 to 254 in the head part 23 (hereinafter, referred to as "first pixel row group" "second pixel row group" "third pixel row group" and "fourth pixel row group") G1, G2, G3, and G4. Therefore, the first pixel row group G1 includes the pixel rows La1, La3, ..., and La(m−1), the second pixel row group G2 includes the pixel rows Lb1, Lb3, ..., and Lb(m−1), the third pixel row group G3 includes the pixel rows La2, La4, ..., and Lam, and the fourth pixel row group G4 includes the pixel rows Lb2, Lb4, ..., and Lbm. As described later, since a set of the first to fourth pixel row groups G1 to G4 is handled as a processed image, in FIG. 6 (and FIG. 7 explained later), these groups are surrounded by one rectangle.

Figure 7:
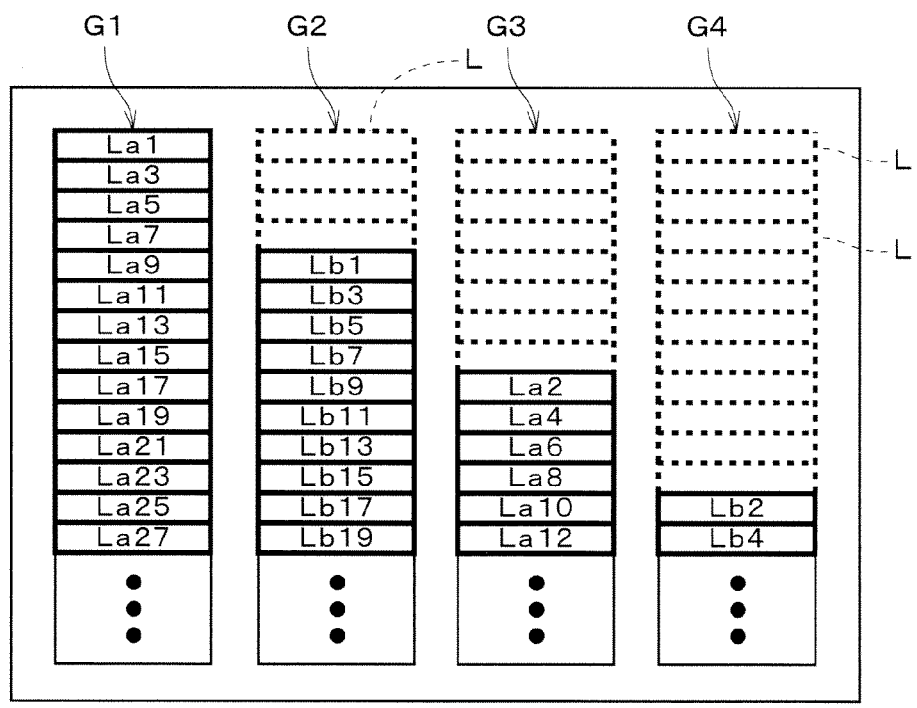
FIG. 7 is a view used for explaining an operation of inserting dummy pixel rows.

The dummy pixel row insertion part 454 inserts dummy pixel rows indicating space as many as needed into the second to fourth pixel row groups G2 to G4. Specifically, as shown in FIG. 7, four dummy pixel rows (each indicated by a broken-line rectangle with reference sign L in FIG. 7, and the same applies to the following) are inserted into a preceding stage of the pixel row Lb1 in the second pixel row group G2, eight dummy pixel rows L are inserted into a preceding stage of the pixel row La2 in the third pixel row group G3, and twelve dummy pixel rows L are inserted into a preceding stage of the pixel row Lb2 in the fourth pixel row group G4. No dummy pixel row is inserted into the first pixel row group G1.

With the above operation, the first to fourth pixel row groups G1 to G4 used in the double-speed writing are acquired as the processed image data, and stored into the image data processing part 431 as necessary. The first to fourth pixel row groups G1 to G4 are groups corresponding to the first to fourth ejection port rows 251 to 254, respectively, and by outputting part of the processed image data to the writing signal generation part 433, the writing signals corresponding to the respective first (top stage) pixel rows of the first to fourth pixel row groups G1 to G4 are outputted to the head control part 432 as the signals indicating whether or not to eject first droplets from the ejection ports 241 in the first to fourth ejection port rows 251 to 254.

After the processed image data is generated (or part of the processed image data is generated) in the image data processing part 431, the movement of the recording paper 9 is started (Step S13b) and the recording paper 9 is moved at a constant speed obtained by multiplying the normal speed by the selected multiple speed value (in the present exemplary operation, at the speed twice the normal speed). Then, concurrently with the relative movement of the ejection part 2 with respect to the recording paper 9, the ejection operations in the head part 23 are repeatedly performed (in other words, the high-speed writing is performed) (Step S14b).

In more detail, at the same time when the vicinity of a predetermined recording start position reaches below (on the (−Z) side of) the first ejection port row 251 on the most (+Y) side (see the upper stage of FIG. 2) on the basis of an output from the encoder 34, the ejection timing signals for the first and second ejection port rows 251 and 252 are outputted from the timing control part 42 to the drive signal generation part 43 and the general control part 44 and subsequently the ejection timing signals for the third and fourth ejection port rows 253 and 254 are outputted.

As explained earlier, since the writing signals corresponding to the respective first pixel rows in the first to fourth pixel row groups G1 to G4 are outputted to the head control part 432 in advance as the signals indicating whether or not to eject first droplets from the ejection ports 241 in the first to fourth ejection port rows 251 to 254, when the timing control part 42 generates the ejection timing signal for each of the ejection port rows 251 to 254 (in the double-speed writing, however, the ejection timing signals for the first and second ejection port rows 251 and 252 are generated at the same time and the ejection timing signals for the third and fourth ejection port rows 253 and 254 are generated at the same time), the drive signal for each ejection port 241 in the ejection port rows 251 to 254 is generated on the basis of the writing signal which has been inputted to the head control part 432 and outputted to the head part 23.

Thus, in the high-speed writing, by generating the ejection timing signal for each ejection port row, the head control part 432 performs the control (i.e. the control to perform the ejection of droplets or the operation in non-writing) on the basis of the processed image data over all the ejection ports 241 in one ejection port row at the same time (not always at the same time for different ejection port rows). In the following processing, in synchronization with the generation of the ejection timing signal for each of the ejection port rows 251 to 254, the writing signals corresponding to the next pixel row (the pixel row next to the pixel row referred to for the ejection control of ink by this ejection timing signal) in the corresponding one of the pixel row groups G1 to G4 is outputted from the writing signal generation part 433 to the head control part 432.

Figure 8:
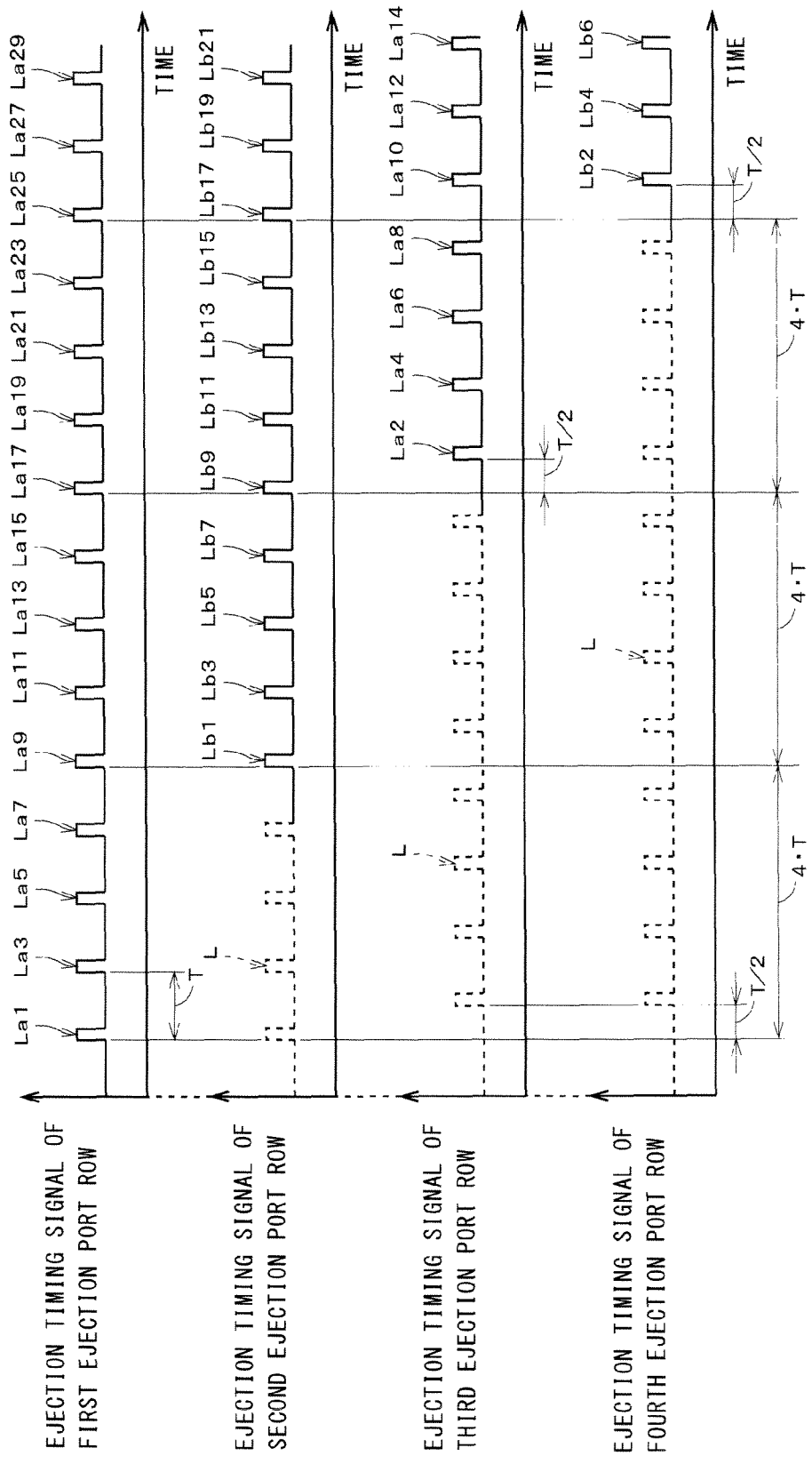
FIG. 8 is a view used for explaining pixel rows referred to in an ejection operation in generating ejection timing signals.

FIG. 8 is a view used for explaining pixel rows referred to in the ejection operations of the first to fourth ejection port rows 251 to 254 in generating the ejection timing signals. The top stage of FIG. 8 shows the ejection timing signals for the first ejection port row 251, the second stage from the top shows the ejection timing signals for the second ejection port row 252, the third stage from the top shows the ejection timing signals for the third ejection port row 253, and the lowest stage shows the ejection timing signals for the fourth ejection port row 254.

In FIG. 8, a plurality of lines (waveforms) indicating the ejection timing signals (part of pulses in each stage of FIG. 8) for the first and second ejection port rows 251 and 252 (or the third and fourth ejection port rows 253 and 254) have the same form. In FIG. 8, the ejection timing signals (pulses) for each of the ejection port rows 251 to 254 are represented by the same reference signs as those for the pixel row groups G1 to G4 which are referred to in the ejection operations at the ejection timing signals and the ejection timing signals for the dummy pixel rows L are indicated by broken lines.

Figure 9:
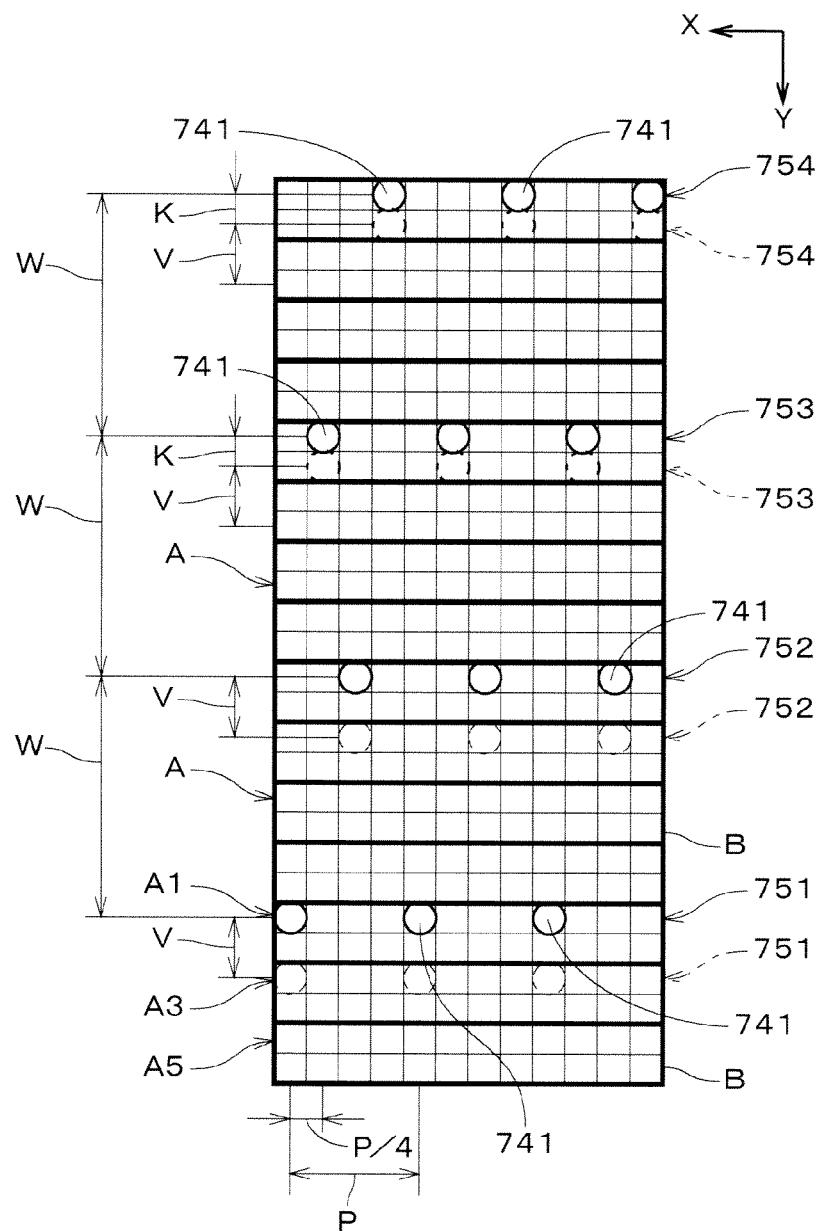
FIG. 9, is a view showing writing positions of dots in generating a first ejection timing signal.

FIG. 9, is a view showing writing positions of dots in generating first ejection timing signals for each of the first and second ejection port rows 251 and 252. In FIG. 9, positions on the recording paper 9 which almost face respective ejection ports 241 in the head part 23 in generating the first ejection timing signals for the first and second ejection port rows 251 and 252 (a position at which the droplet is landed in an actual ejection of the droplet of ink from the ejection port 241 and hereinafter, referred to as an "ejection position") are indicated by solid circles with reference signs "741". Hereinafter, a set of a plurality of ejection positions 741 corresponding to the plurality of ejection ports 241 included in each of the ejection port rows 251 to 254 is referred to as an ejection position row, and four ejection position rows corresponding to the first to fourth ejection port rows 251 to 254, respectively, are referred to as first to fourth ejection position rows 751 to 754. The first to fourth ejection position rows 751 to 754 are sequentially arranged at the column interval W from the (−Y) side toward the (−Y) direction.

Further, in FIG. 9, a plurality of writing positions arrayed on the recording paper 9 are indicated by fine-line rectangles. Herein, the writing position is a minimum unit for the position at which the dot is formed by ejection of the droplet of ink from the ejection port 241, and a pitch of the writing positions in the width direction (X direction) is equal to a fourth of the pitch of the ejection positions 741 in the X direction in each of the ejection position rows 751 to 754 (in other words, a fourth of the ejection port pitch P in each of the ejection port rows 251 to 254). In the present preferred embodiment, a pitch of the writing positions in the scan direction (Y direction) (hereinafter, referred to as a "writing pitch") K is equal to a value obtained by dividing the column interval W of the first to fourth ejection port rows 251 to 254 by 8. In other words, the arrangement of the writing positions in FIG. 9 is the same as the arrangement of positions at which the dots are written in the normal writing. In the image recording apparatus 1, by the continuous movement of the recording paper 9 toward the (−Y) direction, the first to fourth ejection position rows 751 to 754 are relatively moved toward the (+Y) direction with respect to the plurality of writing positions on the recording paper 9. In the following description, a set of writing positions aligned in the width direction is referred to as a writing position row A.

As explained earlier, when the first ejection timing signals are generated, in each of the ejection port rows 251 to 254, the ejection operations on the basis of the first pixel row in the corresponding pixel row group G1 to G4 are performed. With this operation, in the first ejection port row 251, as shown in FIG. 8, the ejection operations on the basis of the pixel row La1 are performed, and dots are written at the writing positions (i.e. writing positions which are present at intervals of three writing positions (at the ejection port pitch P) in the X direction) in a writing position row A1 overlapping the ejection positions 741 in the first ejection position row 751 shown in FIG. 9, respectively. At that time, the amount of ejected ink from each ejection port 241 in the high-speed writing is set larger than the amount of ejected ink from the ejection port 241 in the normal writing.

In the second ejection port row 252, as shown in FIG. 8, the ejection operations on the basis of the dummy pixel row L are performed. As explained earlier, since the dummy pixel row L indicates space, in the following description, it is assumed that virtual dots are formed on the recording paper 9 when the operations in non-writing are performed at each of the ejection ports 241 on the basis of the normal pixel row (in other words, a pixel row other than the dummy pixel row L), but no dot is formed when the operations in non-writing are performed on the basis of the dummy pixel row L. Therefore, no dot is written at the writing positions in a writing position row A overlapping the ejection positions 741 in the second ejection position row 752 shown in FIG. 9.

In the phase control part 421 of the timing control part 42, as shown in FIG. 8, at a time delayed by a time of a half of the basic cycle T from the generation of the first ejection timing signals for the first and second ejection port rows 251 and 252, the first ejection timing signals for the third and fourth ejection port rows 253 and 254 are generated. At that time, though the third and fourth ejection position rows 753 and 754 are relatively moved with respect to the recording paper 9 in the (+Y) direction by the writing pitch P from the positions thereof at the time when the first ejection timing signals for the first and second ejection port rows 251 and 252 are generated (the positions indicated by a plurality of solid-line circles in FIG. 9) to reach the positions indicated by a plurality of broken-line circles in FIG. 9, since the ejection operations on the basis of the dummy pixel rows L are performed in the third and fourth ejection port rows 253 and 254 as shown in FIG. 8, no dot is written at the writing positions in writing position rows A overlapping the ejection positions 741 in the third and fourth ejection position rows 753 and 754.

In the timing control part 42, after a time of the basic cycle T elapses since the generation of the first ejection timing signals for the ejection port rows 251 to 254, a second ejection timing signals are generated. When the second ejection timing signals for the first and second ejection port rows 251 and 252 are generated, the first and second ejection position rows 751 and 752 are relatively moved with respect to the recording paper 9 in the (+Y) direction by a distance obtained by multiplying the movement speed of the recording paper 9 by the basic cycle T (i.e. a distance indicated by the arrow V in FIG. 9, and hereinafter, referred to as a "distance corresponding to the basic cycle") from the positions thereof at the time when the first ejection timing signals are generated (the positions indicated by the plurality of solid-line circles in FIG. 9) to reach the positions indicated by a plurality of fine two-dot-chain-line circles in FIG. 9 (in writing position rows A away from the writing position rows A at the time when the first ejection timing signals are generated, by twice the writing pitch K in the scan direction).

Then, in the first ejection port row 251, as shown in FIG. 8, the ejection operations on the basis of the pixel row La3 are performed, and dots are written at the corresponding writing positions (the writing positions overlapping the first ejection position row 751 indicated by the plurality of two-dot-chain-line circles in FIG. 9) in a writing position row A3 away from the writing position row A1 in FIG. 9 at which the dots corresponding to the pixel row La1 are written in response to the first ejection timing signal (the positions in the first ejection position row 751 indicated by the plurality of solid-line circles in FIG. 9) by a distance V corresponding to the basic cycle in the (+Y) direction. Further, in the second ejection port row 252, as shown in FIG. 8, the ejection operations on the basis of the dummy pixel row L are performed, and no dot is written at the corresponding writing positions in a writing position row A overlapping the second ejection position row 752 indicated by the plurality of two-dot-chain-line circles in FIG. 9.

In each of the third and fourth ejection port rows 253 and 254, when the second ejection timing signals therefor are generated, though the third or fourth ejection position row 753 or 754 reaches a writing position rows A away from the positions thereof at the time when the first ejection timing signals therefor are generated (the positions indicated by the plurality of broken-line circles in FIG. 9) by the distance V corresponding to the basic cycle in the (+Y) direction, since the ejection operations on the basis of the dummy pixel row L are performed as shown in FIG. 8, no dot is written at the corresponding writing positions in the writing position rows A.

Similarly, after a time of the basic cycle T elapses since the generation of the second ejection timing signal in each of the ejection port rows 251 to 254, a third ejection timing signal is generated. In the first ejection port row 251, the ejection operations on the basis of the pixel row La5 are performed, and dots are thereby written in a writing position row A5 away from the writing position row A3 in which the immediately preceding operation is performed (i.e., the writing position row in which the dots corresponding to the pixel row La3 are written) by the distance V corresponding to the basic cycle in the (+Y) direction (in other words, the writing position row A5 is a writing position row away from the writing position row A1 in which the dots corresponding to the pixel row La1 are written in response to the first ejection timing signal by twice the distance V corresponding to the basic cycle in the (+Y) direction).

In the second to fourth ejection port rows 252 to 254, the ejection operations on the basis of the dummy pixel rows L are performed, and no dot is written in writing position rows A overlapping the second to fourth ejection position rows 752 to 754. Further, when the fourth ejection timing signals are generated, in the first ejection port row 251, the ejection operations on the basis of the pixel row La7 are performed and dots are thereby written in a writing position row A away from the writing position row A1 by three times the distance V corresponding to the basic cycle, and in the second to fourth ejection port rows 252 to 254, the ejection operations on the basis of the dummy pixel rows L are performed and no dot is written in the writing position rows A overlapping the second to fourth ejection position rows 752 to 754.

Figure 10:
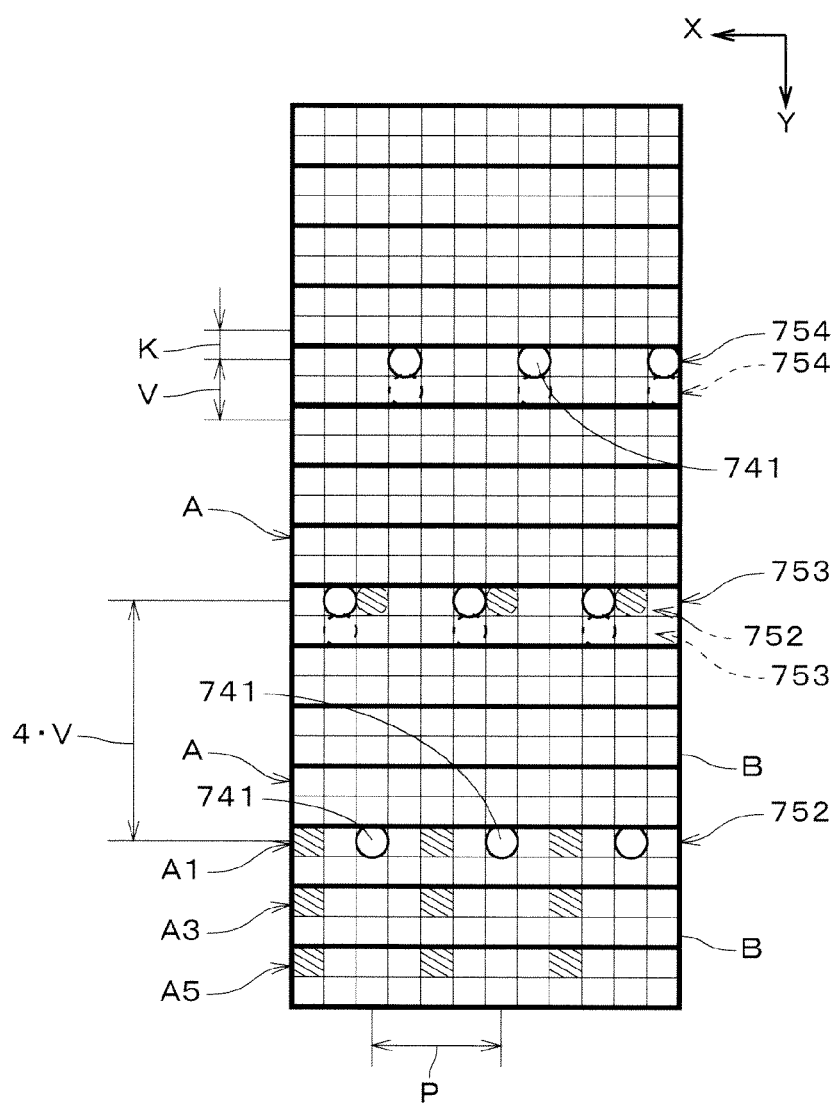
FIG. 10 is a view showing writing positions of dots in generating a fifth ejection timing signal.

Thus, after the generation of the ejection timing signal for each of the ejection port rows 251 to 254 is repeated at the constant basic cycle T, when the fifth ejection timing signals are generated, as shown in FIG. 10, the second ejection position row 752 reaches a position away from the position thereof at the time when the first ejection timing signal is generated (the positions indicated by a plurality of two-dot-chain-line circles hatched therein in FIG. 10) by four times the distance V corresponding to the basic cycle (in other words, by eight times the writing pitch K) in the scan direction, in other words, reaches the writing position row A1 in which the dots corresponding to the pixel row La1 are written by the first ejection port row 251 when the first ejection timing signal is generated.

Figure 11:
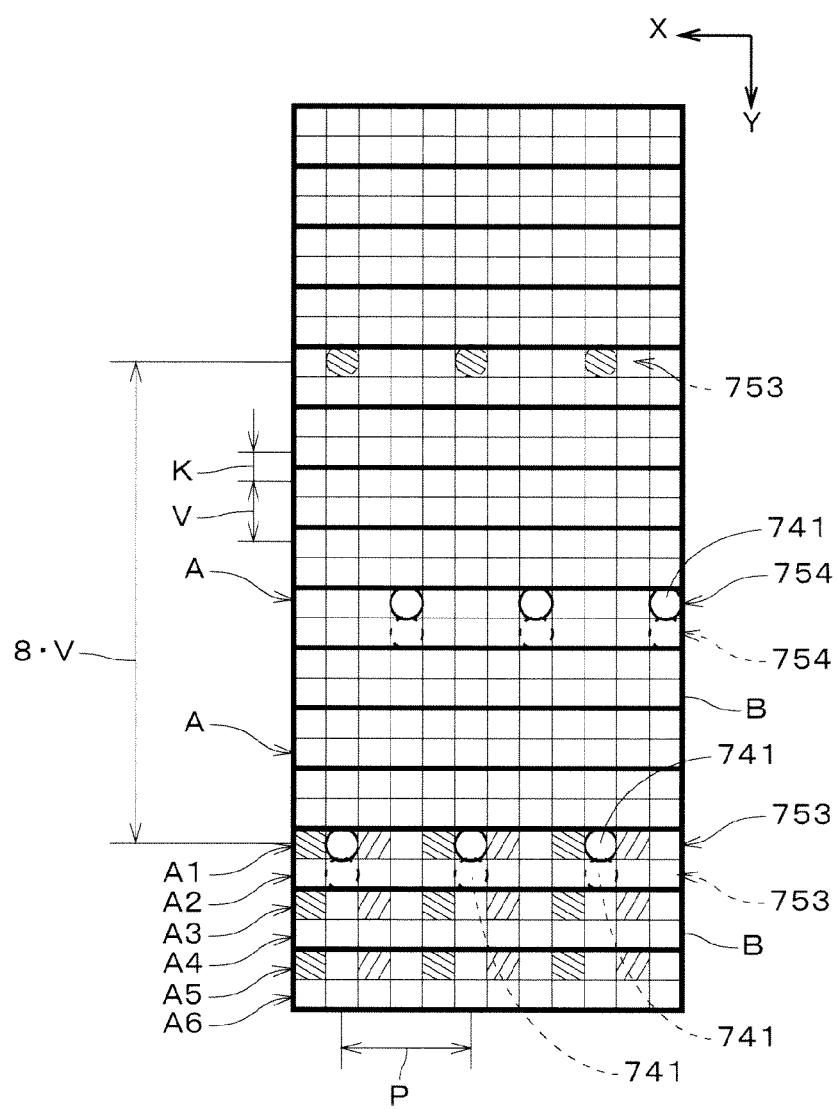
FIG. 11 is a view showing writing positions of dots in generating a ninth ejection timing signal.
Figure 12:
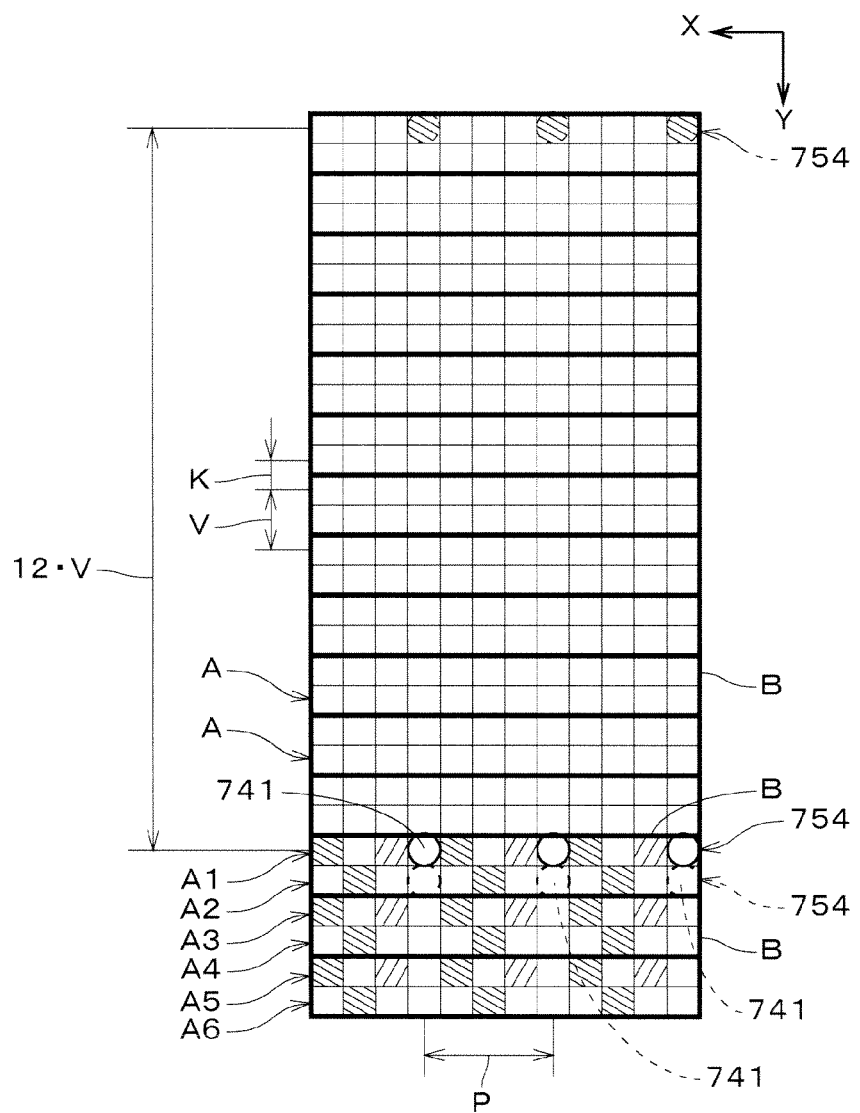
FIG. 12 is a view showing writing positions of dots in generating a thirteenth ejection timing signal.

Then, as shown in FIG. 8, by performing the ejection operations on the basis of the pixel row Lb1 in the second ejection port row 252, dots are written at writing positions in the writing position row A1 overlapping the ejection positions 741 in the second ejection position row 752 (i.e., writing positions which are present at the ejection port pitch P in the X direction, each of which is positioned at the center between the writing positions in which the dots are written by the pass of the first ejection position row 751). In FIG. 10 and FIGS. 11 and 12 explained later, the writing position in which the dot has been written is hatched.

Further, in the first ejection port row 251, the ejection operations on the basis of the pixel row La9 are performed and dots are written in a writing position row A away from the writing position row A1 by eight times the writing pitch K, and in the third and fourth ejection port rows 253 and 254, the ejection operations on the basis of the dummy pixel rows L are performed and no dot is written in the corresponding writing position rows A. As explained earlier, since the ejection timing signals for the third and fourth ejection port rows 253 and 254, which have the same ordinal number as that of the ejection timing signals for the first and second ejection port rows 251 and 252, are generated, concurrently with the movement of the first to fourth ejection position rows 751 to 754 from the positions at the time when the ejection timing signals for the first and second ejection port rows 251 and 252 are generated (the positions indicated by a plurality of solid-line circles in FIG. 10) by the writing pitch K in the scan direction, in FIG. 10, the third and fourth ejection position rows 753 and 754 in generating the ejection timing signals for the third and fourth ejection port rows 253 and 254 are indicated by a plurality of broken-line circles (the same applies to FIGS. 11 and 12 explained later).

With respect only to the second ejection port row 252, when the sixth ejection timing signal is generated, the ejection operations on the basis of the pixel row Lb3 are performed and dots are thereby written in the writing position row A3 away from the writing position row A1 by the distance V corresponding to the basic cycle (twice the writing pitch K). When the seventh ejection timing signal is generated, the ejection operations on the basis of the pixel row Lb5 are performed and dots are thereby written in the writing position row A5 away from the writing position row A1 by twice the distance V corresponding to the basic cycle, and when the eighth ejection timing signal is generated, the ejection operations on the basis of the pixel row Lb7 are performed and dots are thereby written in a writing position row A away from the writing position row A1 by three times the distance V corresponding to the basic cycle.

In generating the ninth ejection timing signals for the first and second ejection port rows 251 and 252, as shown in FIG. 11, the third ejection position row 753 reaches the writing position row A1 away from the positions thereof at the time when the first ejection timing signals for the first and second ejection port rows 251 and 252 are generated (the positions indicated by a plurality of two-dot-chain-line circles hatched therein in FIG. 11) by eight times the distance V corresponding to the basic cycle in the scan direction. Then, as shown in FIG. 8, at a time delayed by a half of the basic cycle T from this time, the ejection timing signal for the third ejection port row 253 (and the fourth ejection port row 254) is generated and with the ejection operations on the basis of the pixel row La2 by the third ejection port row 253, dots are written at the corresponding writing positions in a writing position row A2 on the (+Y) side of the writing position row A1 (i.e., writing positions overlapping the ejection positions 741 in the ejection position row 753 which are indicated by a plurality of broken-line circles in FIG. 11).

When the ninth ejection timing signal is generated, in the first ejection port row 251, the ejection operations on the basis of the pixel row La17 are performed and dots are thereby written in a corresponding writing position row A, and in the second ejection port row 252, the ejection operations on the basis of the pixel row Lb9 are performed and dots are thereby written in a corresponding writing position row A. In the fourth ejection port row 254, the ejection operations on the basis of the dummy pixel row L are performed and no dot is written in a corresponding writing position row A.

With respect only to the third ejection port row 253, when the tenth ejection timing signal is generated, the ejection operations on the basis of the pixel row La4 are performed and dots are thereby written in a writing position row A4 away from the writing position row A2 by the distance V corresponding to the basic cycle (twice the writing pitch K). When the eleventh ejection timing signal is generated, the ejection operations on the basis of the pixel row La6 are performed and dots are thereby written in a writing position row A6 away from the writing position row A2 by twice the distance V corresponding to the basic cycle, and when the twelfth ejection timing signal is generated, the ejection operations on the basis of the pixel row La8 are performed and dots are thereby written in a writing position row A away from the writing position row A2 by three times the distance V corresponding to the basic cycle.

Therefore, assuming that each combination of one ejection port 241 in the first ejection port row 251 and one ejection port 241 in the third ejection port row 253, which is adjacent to the above one ejection port 241 in the width direction, (for example, the ejection ports 241a and 241d in FIG. 2) is defined as an ejection port group, with respect to each ejection port group, two ejection ports 241 away from each other in the scan direction in the ejection port group sequentially perform the ejection operations onto two adjacent writing position rows A, and each ejection port group writes only one dot into each writing position row A.

Further, when the thirteenth ejection timing signals for the first and second ejection port rows 251 and 252 are generated, as shown in FIG. 12, the fourth ejection position row 754 reaches the writing position row A1 away from the positions thereof at time when the first ejection timing signals for the first and second ejection port rows 251 and 252 are generated (the positions indicated by a plurality of two-dot-chain-line circles hatched therein in FIG. 12) by twelve times the distance V corresponding to the basic cycle in the scan direction.

Then, as shown in FIG. 8, at a time delayed by a half of the basic cycle T from this time, the ejection timing signal for the fourth ejection port row 254 (and the third ejection port row 253) is generated and with the ejection operations on the basis of the pixel row Lb2 by the fourth ejection port row 254, dots are written at writing positions which are present at the ejection port pitch P in the X direction in the writing position row A2 on the (+Y) side of the writing position row A1, each of which is positioned at the center between the writing positions in which the dots are written by the pass of the third ejection position row 753 (i.e., writing positions overlapping the ejection positions 741 in the ejection position row 754 which are indicated by a plurality of broken-line circles in FIG. 12).

When the thirteenth ejection timing signal is generated, in the first ejection port row 251, the ejection operations on the basis of the pixel row La25 are performed and dots are written in a corresponding writing position row A, in the second ejection port row 252, the ejection operations on the basis of the pixel row Lb17 are performed and dots are written in a corresponding writing position row A, and in the third ejection port row 253, the ejection operations on the basis of the pixel row La10 are performed and dots are written in a corresponding writing position row A.

With respect only to the fourth ejection port row 254, when the fourteenth ejection timing signal is generated, the ejection operations on the basis of the pixel row Lb4 are performed and dots are thereby written in the writing position row A4 away from the writing position row A2 by the distance V corresponding to the basic cycle (twice the writing pitch K), and when the fifteenth ejection timing signal is generated, the ejection operations on the basis of the pixel row Lb6 are performed and dots are thereby written in the writing position row A6 away from the writing position row A2 by twice the distance V corresponding to the basic cycle.

Therefore, assuming that each combination of one ejection port 241 in the second ejection port row 252 and one ejection port 241 in the fourth ejection port row 254, which is adjacent to the above one ejection port 241 in the width direction, (for example, the ejection ports 241c and 241e in FIG. 2) is defined as an ejection port group, with respect to each ejection port group, two ejection ports 241 included in each ejection port group sequentially perform the ejection operations onto two adjacent writing position rows A, and each ejection port group writes one dot into each writing position row A. In each writing position row A, the writing positions onto which the ejection operations are performed are present at intervals of one writing position, and also in a set of writing positions aligned in the scan direction, the writing positions onto which the ejection operations are performed are present at intervals of one writing position (in other words, the writing positions onto which the ejection operations are performed are arranged in a checkerboard-like manner).

Herein, as explained earlier, since the distance V corresponding to the basic cycle corresponds to twice the writing pitch K, every time when the ejection timing signal is generated, each of the ejection position rows 751 to 754 is positioned onto a writing position row A away from another writing position row A onto which the ejection position row is disposed when the immediately preceding ejection timing signal is generated by twice the writing pitch K in the (+Y) direction. Therefore, as represented by a plurality of thick rectangles in FIG. 12 (and FIGS. 9 to 11), assuming that a set of two writing position rows A which are continuously arranged in the scan direction (for example, the writing position row A1 in which the dots are written by the first and second ejection port rows 251 and 252 and the writing position row A2 in which the dots are written by the third and fourth ejection port rows 253 and 254) is defined as one writing position block B, in each of a plurality of writing position blocks B arranged in the scan direction (except those arranged on the (−Y) side of the writing position row A1), the dots are written into the writing position row A on the (−Y) side by the first and second ejection port rows 251 and 252 and the dots are written into the writing position row A on the (+Y) side by the third and fourth ejection port rows 253 and 254. In other words, between the first and second ejection port rows 251 and 252 and the third and fourth ejection port rows 253 and 254, the positions at which the dots are written are shifted in the scan direction by a half of the distance V corresponding to the basic cycle (by the writing pitch K).

Further, in the writing position row A on the (−Y) side in each writing position block B, dots are written at every four writing positions by the first ejection port row 251, and dots are written by the second ejection port row 252 at the centers between the adjacent dots written by the first ejection port row 251. In this writing position row A, in other words, dots are written at every other writing positions alternately by the first and second ejection port rows 251 and 252. Also in the writing position row A on the (+Y) side, dots are written at every four writing positions by the third ejection port row 253, and dots are written by the fourth ejection port row 254 at the centers between the adjacent dots written by the third ejection port row 253. In this writing position row A, in other words, dots are written at every other writing positions alternately by the third and fourth ejection port rows 253 and 254.

Figures 13, 14, 15:
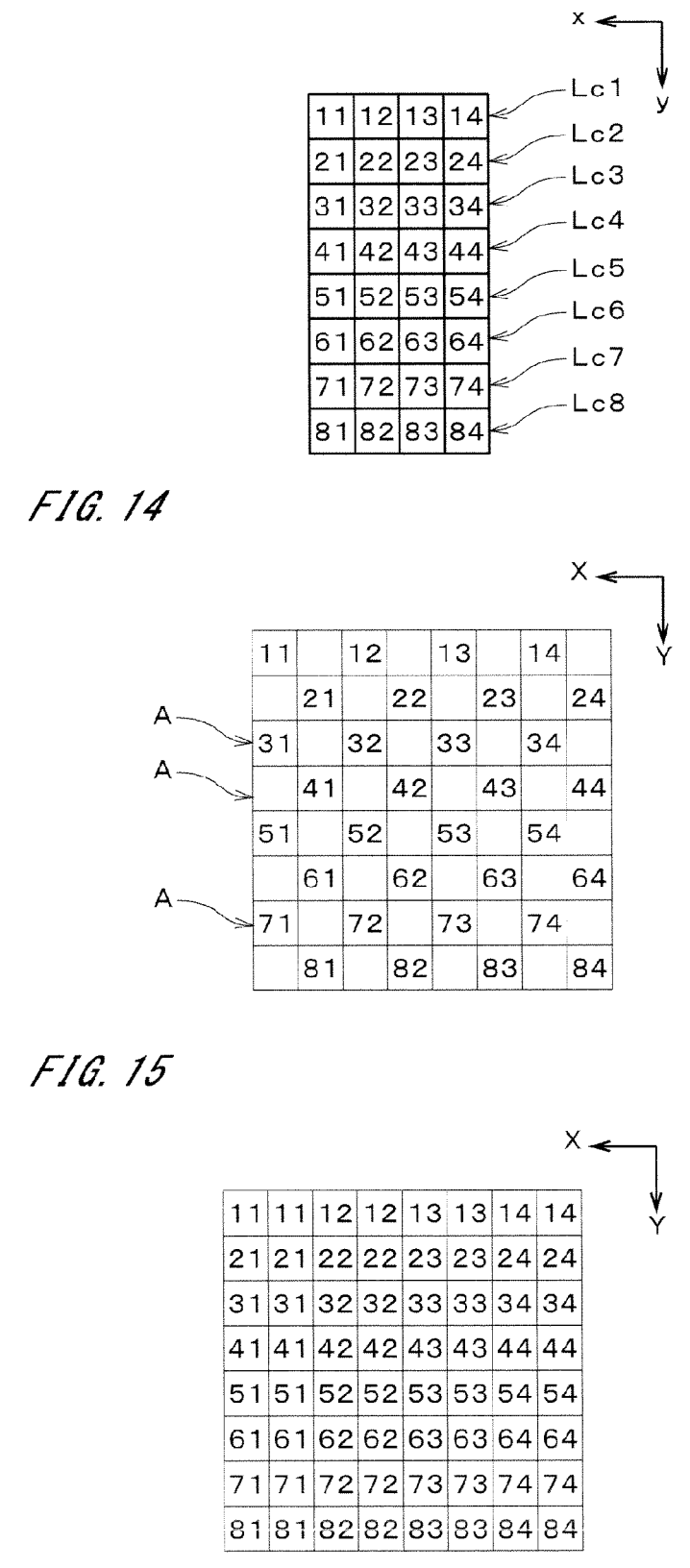

On the other hand, as explained earlier, in the operation performed in Step S12b of FIG. 4, first, a size (the number of pixels) of an object image of FIG. 5 in the width direction is changed to a half in accordance with the selected multiple speed value, and (part of) a halftone dot image in which the image is halftoned is prepared as shown in FIG. 13. In the halftone dot image shown in FIG. 13, pixel rows are represented by reference signs Lc1 to Lc8, and numbers are given inside rectangles representing pixels. Subsequently, in each of the pixel rows Lc1 to Lc8, by extracting every other pixel from the (+x) side toward the (−x) direction, the pixel rows La1, La2. La3, . . . , and La8 and the pixel rows Lb1, Lb2, Lb3, . . . , and Lb8 are generated from the pixel rows Lc1 to Lc8. Then, the pixel rows La1, Lb1, La2, Lb2, La3, Lb3, . . . , La8, and Lb8 are allocated to the four pixel row groups G1, G2. G3, and G4 as many as the ejection port rows 251 to 254 in the head part 23 (see, FIG. 6).

With this operation, the pixel rows of the image shown in FIG. 13 corresponding to the writing position rows A on the respective (−Y) side of the writing position blocks B and the pixel rows of the image shown in FIG. 13 corresponding to the writing position rows A on the respective (+Y) side of the writing position blocks B are allocated to the first and second ejection port rows 251 and 252 and the third and fourth ejection port rows 253 and 254, respectively, and the pixels in the corresponding pixel rows of the image of FIG. 13 are alternately allocated from (+x) side toward the (−x) direction to the first ejection port row 251 and the second ejection port row 252 (or, the third ejection port row 253 and the fourth ejection port row 254).

FIG. 14 is a view showing writing positions arrayed on the recording paper 9. In FIG. 14, a plurality of writing positions on the recording paper 9 are represented by fine-line rectangles and the numbers given to the pixels in the image of FIG. 13 are given inside the rectangles representing the writing positions corresponding to the pixels, respectively (the same applies to FIGS. 15, 17, and 18 explained later). In the writing position with no number inside the rectangle, no dot is written.

As explained earlier, in each writing position row A on the recording paper 9, the ejection operations on the basis of the pixel values of a plurality of pixels in the corresponding one of the pixel rows Lc1 to Lc8 in FIG. 13 are performed on the writing positions which are present at intervals of one writing position. Therefore, the image of FIG. 13 obtained by changing the size of the original image in a direction corresponding to the width direction to a half and performing halftoning thereon is recorded on the recording paper 9 with its size in the width direction changed to twice, as shown in FIG. 14, to thereby have the same size as that of an image recorded by the normal writing. In the two writing position rows A adjacent to each other in the scan direction (Y direction), actually, the writing positions on which the ejection operation are performed are shifted by one writing position in the width direction.

Further, as shown in FIG. 8, in the second ejection port row 252, after the generation of the fifth ejection timing signal, the ejection operations on the basis of a normal pixel row (in other words, the pixel row other than the dummy pixel row L) are performed and dots are thereby written. In the third ejection port row 253, after the generation of the ninth ejection timing signal, the ejection operations on the basis of a normal pixel row are performed and dots are thereby written, and in the fourth ejection port row 254, after the generation of the thirteenth ejection timing signal, the ejection operations on the basis of a normal pixel row are performed and dots are thereby written.

On the other hand, in the dummy pixel row insertion part 454, four dummy pixel rows L are inserted into a preceding stage of the pixel row Lb1 in the second pixel row group G2, eight dummy pixel rows L are inserted into a preceding stage of the pixel row La2 in the third pixel row group G3, and twelve dummy pixel rows L are inserted into a preceding stage of the pixel row Lb2 in the fourth pixel row group G4. With this operation, the ejection operations on the basis of the normal pixel row are performed after the generation of the fifth ejection timing signal in the second ejection port row 252, the ejection operations on the basis of the normal pixel row are performed after the generation of the ninth ejection timing signal in the third ejection port row 253, and the ejection operations on the basis of the normal pixel row are performed after the generation of the thirteenth ejection timing signal in the fourth ejection port row 254.

Thus, each of the ejection port rows performs the ejection operations of all the ejection ports 241 therein at the constant basic cycle T at the same time concurrently with the relative movement of the recording paper 9 with respect to the head part 23, and dots are thereby written in the plurality of writing position rows A which are present on the (+Y) side from the writing position row A1 on the recording paper 9 in accordance with the processed image data. Then, after the entire image indicated by the processed image data is recorded on the recording paper 9, the movement of the recording paper 9 is stopped, and the high-speed writing in the image recording apparatus 1 is completed (Step S15b). In an actual case, since the ejection operations on the basis of the normal pixel rows are completed in the first to third ejection port rows 251 to 253 before the ejection operations on the basis of the last pixel row Lbm are performed by the fourth ejection port row 254, the dummy pixel rows L are inserted also in post-stages of the normal pixel rows in the first to third pixel row groups G1 to G3.

Herein, in the normal writing, since the writing of one writing position row is performed at the basic cycle T ($\mu$s), assuming that the normal resolution in the scan direction in the normal writing is D (dpi), the movement speed E1 (m/sec) of the recording paper 9 in the scan direction in the normal writing is indicated by Eq. 1.

$$E1=254000/D/T \quad \text{(Eq. 1)}$$

On the other hand, in the double-speed writing corresponding to the normal resolution D, since the writing of two adjacent writing position rows is performed at the basic cycle T ($\mu$s) (in other words, the time required for one writing position row is T/2 ($\mu$s)), the movement speed E2 (m/sec) of the recording paper 9 in the scan direction in the double-speed writing is indicated by Eq. 2 and the movement speed E2 is twice the movement speed E1 in the normal writing.

$$E2=25400/D/(T/2)=2\cdot25400/D/T \quad \text{(Eq. 2)}$$

If an image in which a size of the image of FIG. 13 in the x direction is changed to double by inserting a pixel having the same pixel value as that of each pixel in the image of FIG. 13 into the (−x) side of the pixel of the image is recorded by the normal writing, an image shown in FIG. 15 is recorded on the recording paper 9. In a case where writing positions are arranged on the recording paper 9 at a pitch which corresponds to 1440 (dpi) in the width direction and at a pitch which corresponds to 360 (dpi) in the scan direction, since the same ejection operation is performed onto the two writing positions adjacent to each other in the width direction in the recorded image of FIG. 15, assuming that one dot is considered to be written at these writing positions, recording is performed in the recorded image of FIG. 15 with a resolution of 720 (=1440/2) (dpi) in the width direction and with a resolution of 360 (dpi) in the scan direction.

On the other hand, in the formation of the recorded image of FIG. 14, since the ejection operation is performed onto one of the two writing positions on which the same ejection operations are performed in the formation of the recorded image of FIG. 15 (the two writing positions on which one dot is considered to be written), it can be considered that the recorded image of FIG. 14 has the same resolution as that of the recorded image of FIG. 15. Also in this case, by making the amount of ink ejected from each ejection port 241 (in other words, the dot to be written by one ejection port 241) in the formation of the recorded image of FIG. 14 larger than that in the formation of the recorded image of FIG. 15, it is possible to give the recorded image of FIG. 14 the density approximate to that of the recorded image of FIG. 15.

Figure 16:
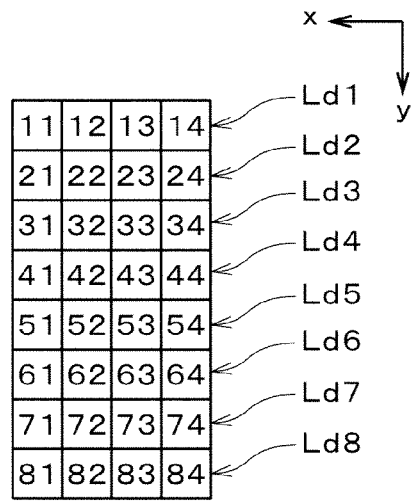
FIG. 16 is a view showing an image obtained by changing a size of the original image in the width direction.

Next, explanation will be made on a case where another selected multiple speed value is selected in Step S10 of FIG. 4. When the user selects "4" as a selected multiple speed value which is another one of the submultiples of the number of the ejection port rows 251 to 254 and the input of the selection is confirmed by the computer 5 (Step S11), in Step S12b of FIG. 4, the size changing part 451 changes a size (the number of pixels) of the original image in a direction corresponding to the width direction to one fourth in accordance with the selected multiple speed value, and further the halftoning part 452 performs halftoning, to thereby prepare (part of) a halftone dot image as shown in FIG. 16. In the halftone dot image of FIG. 16, pixel rows are represented by reference signs Ld1 to Ld8, and numbers are given inside rectangles representing pixels.

Subsequently, the pixel row allocation part 453 allocates the pixel rows Ld1 to Ld8 to the pixel row groups G1, G3, G2, and G4. As explained earlier, the pixel row groups G1, G3, G2, and G4 correspond to the first ejection port row 251, the third ejection port row 253, the second ejection port row 252, and the fourth ejection port row 254, respectively, and in the image recording apparatus 1, from the (+X) side toward the (−X) direction in the width direction, the plurality of ejection ports 241 are arranged in the order of one ejection port 241 of the first ejection port row 251, one ejection port 241 of the third ejection port row 253, one ejection port 241 of the second ejection port row 252, and one ejection port 241 of the fourth ejection port row 254 (see the upper stage of FIG. 2).

Then, the dummy pixel row insertion part 454 inserts two dummy pixel rows L into a preceding stage of the pixel row Ld3 in the second pixel row group G2, four dummy pixel rows L into a preceding stage of the pixel row Ld2 in the third pixel row group G3, and six dummy pixel rows L into a preceding stage of the pixel row Ld4 in the fourth pixel row group G4.

Subsequently, the movement of the recording paper 9 at four times the normal speed is started (Step S13b), and concurrently with the relative movement of the election part 2 with respect to the recording paper 9, the ejection operations in the head part 23 are repeatedly performed (in other words, the quadruple-speed writing is performed) (Step S14b).

At that time, in the phase control part 421 of the timing control part 42, the respective ejection timing signals corresponding to the first to fourth ejection port rows 251 to 254 are sequentially outputted, being delayed by a time of a fourth of the basic cycle T. Specifically, the ejection timing signal for the first ejection port row 251 is first generated, the ejection timing signal for the third ejection port row 253 is generated after a time of a fourth of the basic cycle T elapses since the generation of the ejection timing signal for the first ejection port row 251, the ejection timing signal for the second ejection port row 252 is generated after a time of a fourth of the basic cycle T elapses since the generation of the ejection timing signal for the third ejection port row 253, and the ejection timing signal for the fourth ejection port row 254 is generated after a time of a fourth of the basic cycle T elapses since the generation of the ejection timing signal for the second ejection port row 252. Further, a next ejection timing signal for the first ejection port row 251 is generated after the basic cycle T elapses since the generation of the first ejection timing signal for the first ejection port row 251, and a distance of the relative movement of the first to fourth ejection position rows 751 to 754 toward the (+Y) direction during the basic cycle T is a distance which corresponds to four writing position rows A (see FIG. 9).

Figure 17:
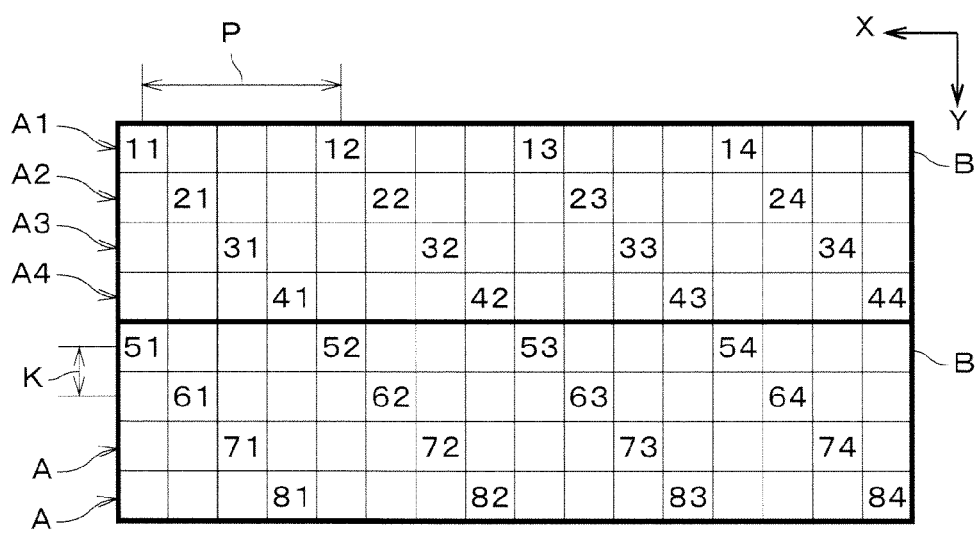
FIGS. 17 and 18 are views each showing writing positions of dots on the recording paper.

Therefore, when the first ejection timing signal for the first ejection port row 251 is generated, in the first ejection port row 251, the ejection operation on the basis of the pixel row Ld1 is performed and dots corresponding to the pixels in the pixel row Ld1 of the image of FIG. 16 are written at writing positions represented by the same numbers as those of the pixels (i.e. writing positions which are present at intervals of three writing positions) in a writing position row A1 shown in FIG. 17. Further, when the first ejection timing signal for each of the second to fourth ejection port rows 252 to 254 is generated, in each of the second to fourth ejection port rows 252 to 254, since the ejection operation on the basis of the dummy pixel row L is performed, no dot is written in a corresponding writing position row A.

Further, since the head part 23 is relatively moved with respect to the recording paper 9 in the scan direction by four times the writing pitch K during the basic cycle T, when the third ejection timing signal for the first ejection port row 251 is generated, the second ejection position row 752 away from the first ejection position row 751 by eight times the writing pitch K in the scan direction reaches the writing position row A1 (see FIG. 9), and after a time of two fourths of the basic cycle T elapses since this time, the third ejection timing signal for the second ejection port row 252 is generated. With this generation, the ejection operation of the second ejection port row 252 on the basis of the pixel row Ld3 is performed and dots corresponding to the pixels in the pixel row Ld3 of the image of FIG. 16 are written at writing positions represented by the same numbers as those of the pixels (i.e. writing positions which are present at intervals of three writing positions) in a writing position row A3 away from the writing position row A1 in FIG. 17 by twice the writing pitch K.

Similarly, when the fifth ejection timing signal for the first ejection port row 251 is generated, the third ejection position row 753 away from the first ejection position row 751 by sixteen times the writing pitch K in the scan direction reaches the writing position row A1, and after a time of a fourth of the basic cycle T elapses since this time, the fifth ejection timing signal for the third ejection port row 253 is generated. With this generation, the ejection operation of the third ejection port row 253 on the basis of the pixel row Ld2 is performed and dots corresponding to the pixels in the pixel row Ld2 of the image of FIG. 16 are written at writing positions represented by the same numbers as those of the pixels (i.e. writing positions which are present at intervals of three writing positions) in a writing position row A2 away from the writing position row A1 in FIG. 17 by the writing pitch K.

Further, when the seventh ejection timing signal for the first ejection port row 251 is generated, the fourth ejection position row 754 away from the first ejection position row 751 by twenty-four times the writing pitch K in the scan direction reaches the writing position row A1, and after a time of three fourths of the basic cycle T elapses since this time, the seventh ejection timing signal for the fourth ejection port row 254 is generated. With this generation, the ejection operation of the fourth ejection port row 254 on the basis of the pixel row Ld4 is performed and dots corresponding to the pixels in the pixel row Ld4 of the image of FIG. 16 are written at writing positions represented by the same numbers as those of the pixels (i.e. writing positions which are present at intervals of three writing positions) in a writing position row A4 away from the writing position row A1 in FIG. 17 by three times the writing pitch K.

Therefore, assuming that a set of four writing position rows A which are continuously arranged in the scan direction (for example, the writing position rows A1 to A4) is defined as one writing position block, in each of a plurality of writing position blocks B represented by thick-line rectangles in FIG. 17, dots are written into a writing position row A on the most (−Y) side by the first ejection port row 251, dots are written by the third ejection port row 253 into a writing position row A positioned on the (+Y) side of the writing position row A of the first ejection port row 251, dots are written by the second ejection port row 252 into a writing position row A positioned on the (+Y) side of the writing position row A of the third ejection port row 253, and dots are written into a writing position row A on the most (+Y) side by the fourth ejection port row 254. Further, assuming that each combination of one ejection port 241 in the first ejection port row 251, one ejection port 241 in the third ejection port row 253 which is adjacent to this ejection port 241 in the first ejection port row 251 in the width direction, one ejection port 241 in the second ejection port row 252 which is adjacent to this ejection port 241 in the third ejection port row 253 in the width direction, and one ejection port 241 in the fourth ejection port row 254 which is adjacent to this ejection port 241 in the second ejection port row 252 in the width direction (for example, the ejection ports 241*a*, 241*d*, 241*c*, and 241*e* in FIG. 2) is defined as an ejection port group, with respect to each ejection port group, four ejection ports 241 away from one another in the scan direction in the ejection port group sequentially perform the ejection operations onto four writing position rows A in the writing position block B, and each ejection port group writes only one dot into each writing position row A.

After the entire image indicated by the processed image data is thus recorded on the recording paper 9, the movement of the recording paper 9 is stopped (Step S15*b*), and the quadruple-speed writing is completed.

Figure 18:
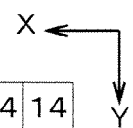

If an image in which a size of the image of FIG. 16 in a direction corresponding to the x direction is changed to quadruple by inserting three pixels having the same pixel value as that of each pixel in the image of FIG. 16 into the (−x) side of the pixel of the image is recorded by the normal writing, an image shown in FIG. 18 is recorded on the recording paper 9. In a case where writing positions are arranged on the recording paper 9 at a pitch which corresponds to 1440 (dpi) in the width direction and at a pitch which corresponds to 360 (dpi) in the scan direction, since the same ejection operation is performed onto the four writing positions which are continuously arranged in the width direction in the recorded image of FIG. 18, assuming that one dot is considered to be written at these writing positions, recording is performed in the recorded image of FIG. 18 with a resolution of 360 (=1440/4) (dpi) in the width direction and with a resolution of 360 (dpi) in the scan direction.

On the other hand, in the formation of the recorded image of FIG. 17, since the ejection operation is performed onto one of the four writing positions on which the same ejection operations are performed in the recorded image of FIG. 18 (the four writing positions on which one dot is considered to be written), it can be considered that the recorded image of FIG. 17 obtained by recording at four times the normal speed has the same resolution as that of the recorded image of FIG. 18.

Thus, in the case where the normal writing is performed by using the head part 23 provided with the four ejection port rows 251 to 254, while the recording paper 9 is moved in the scan direction at the constant normal speed, each of the ejection ports 241 in the head part 23 performs the ejection operation onto each of the plurality of writing positions which are disposed at the same position as that of the ejection port 241 in the width direction and present at the constant writing pitch K on the recording paper 9 in the scan direction (writing positions aligned in the scan direction).

In the case where the double-speed writing is performed with the selected multiple speed value of "2", while the recording paper 9 is moved at twice the normal speed, the first and third ejection port rows 251 an 253 (and the second and fourth ejection port rows 252 and 254) in which two ejection ports 241 are continuously disposed in the width direction sequentially perform the ejection operations onto the writing positions which are disposed at the same positions as those of the two ejection ports 241 in the width direction and present at the writing pitch K on the recording paper 9 in the scan direction and only one dot is written at each position in the scan direction in the entire writing positions which the ejection positions 741 of the two ejection ports 241 pass, to thereby perform the double-speed writing.

In the case where the quadruple-speed writing is performed with the selected multiple speed value of "4", while the recording paper 9 is moved at four times the normal speed, the first ejection port row 251, the third ejection port row 253, the second ejection port row 252, and the fourth ejection port row 254 in which four ejection ports 241 are continuously disposed in the width direction sequentially perform the ejection operations onto the writing positions which are disposed at the same positions as those of the four ejection ports 241 in the width direction and present at the writing pitch K on the recording paper 9 in the scan direction and only one dot is written at each position in the scan direction in the entire writing positions which the ejection positions 741 of the four ejection ports 241 pass, to thereby perform the quadruple-speed writing.

In a case where the normal writing is performed with a resolution of e.g. 360 (dpi) in the scan direction, by changing the movement speed of the recording paper 9 to double or quadruple the normal speed while performing the same ejection operation as that in the normal writing in the head part 23, it is considered that the four ejection port rows 251 to 254 form a dot row in which dots are aligned in the width direction and an image having a resolution of 180 (dpi) or 90 (dpi) in the scan direction is recorded at high speed. Since the resolution in the scan direction in the normal writing is usually lower than the resolution in the width direction, however, in a recorded image formed by such an image recording technique, the interval between adjacent dots in the scan direction increases and this significantly deteriorates the quality of the image.

On the other hand, in the image recording apparatus 1, assuming that the submultiple of the number of ejection port rows in the head part 23 is N (N: at least one integer not less than 2), in a case where the moving mechanism 3 moves the recording paper 9 at N times the normal speed, when N ejection port rows in which N ejection ports 241 are continuously disposed in the width direction in the head part 23 sequentially perform the ejection operations onto the writing positions which are present on the recording paper 9 at the writing pitch K in the scan direction, the N ejection port rows (N ejection ports 241 which are continuously disposed in the width direction) write dots at positions (each writing position row A) in the scan direction with the positions in the scan direction at which the dots are written being shifted, to thereby perform the N-fold-speed writing. As a result, in the image recording apparatus 1, the ejection operations of all the ejection ports 241 in each ejection port row are performed at basic cycle at the same time, and recording of a high-precision image on the recording paper 9 can be achieved.

Further, in the image recording apparatus 1, in performing the N-fold-speed writing, since the amount of ink ejected from each ejection port 241 is made larger than that in the normal writing, it is possible to record an image with a density approximate to that of the image recorded by the normal writing and suppress deterioration in the quality of the recorded image in the high-speed writing.

As explained earlier, when recording is performed at twice the normal speed with (N=2), in generating the processed image data, the processed image data is obtained from the halftone dot image generated by changing a size (the number of pixels) of the original image indicating an image to be recorded by the normal writing in the x direction corresponding to the width direction to a half, and one dot corresponding to each pixel in the halftone dot image is formed on the recording paper 9. Further, when recording is performed at four times the normal speed with (N=4), in generating the processed image data, the processed image data is obtained from the halftone dot image generated by changing a size of the original image in the x direction to one fourth, and one dot corresponding to each pixel in the halftone dot image is formed on the recording paper 9. In other words, when recording is performed at N times the normal speed, in generating the processed image data, the processed image data is obtained from the halftone dot image generated by changing a size of the original image in the x direction to one N-th, and one dot corresponding to each pixel in the halftone dot image is formed on the recording paper 9.

As explained earlier, since the image recorded by the N-fold-speed writing has the same size of outer shape as that of the image recorded by the normal writing, assuming that respective resolutions of the image (object image) recorded by the normal writing in the width direction and in the scan direction are $D_H$ and $D_V$ (for example, 1440 (dpi) and 360 (dpi), respectively), in the high-speed writing at N times the normal speed, it is considered that the image is recorded with a resolution of $D_H/N$ (for example, 720 (dpi) when N=2, and 360 (dpi) when N=4) in the width direction and a resolution of $D_V$ in the scan direction. In other words, in the image recording apparatus 1, by changing the resolution of the image recorded by normal writing in the width direction to one N-th, it is possible to perform high-speed recording at N times the normal speed, with the resolution in the scan direction maintained. In general, degradation in the resolution in the width direction has less effect on the quality of the recorded image as compared with degradation in the resolution in the scan direction.

Next, explanation will be made on an operation of the halftoning part 452 and generation of a threshold matrix to be used in the halftoning part 452.

Figure 19:
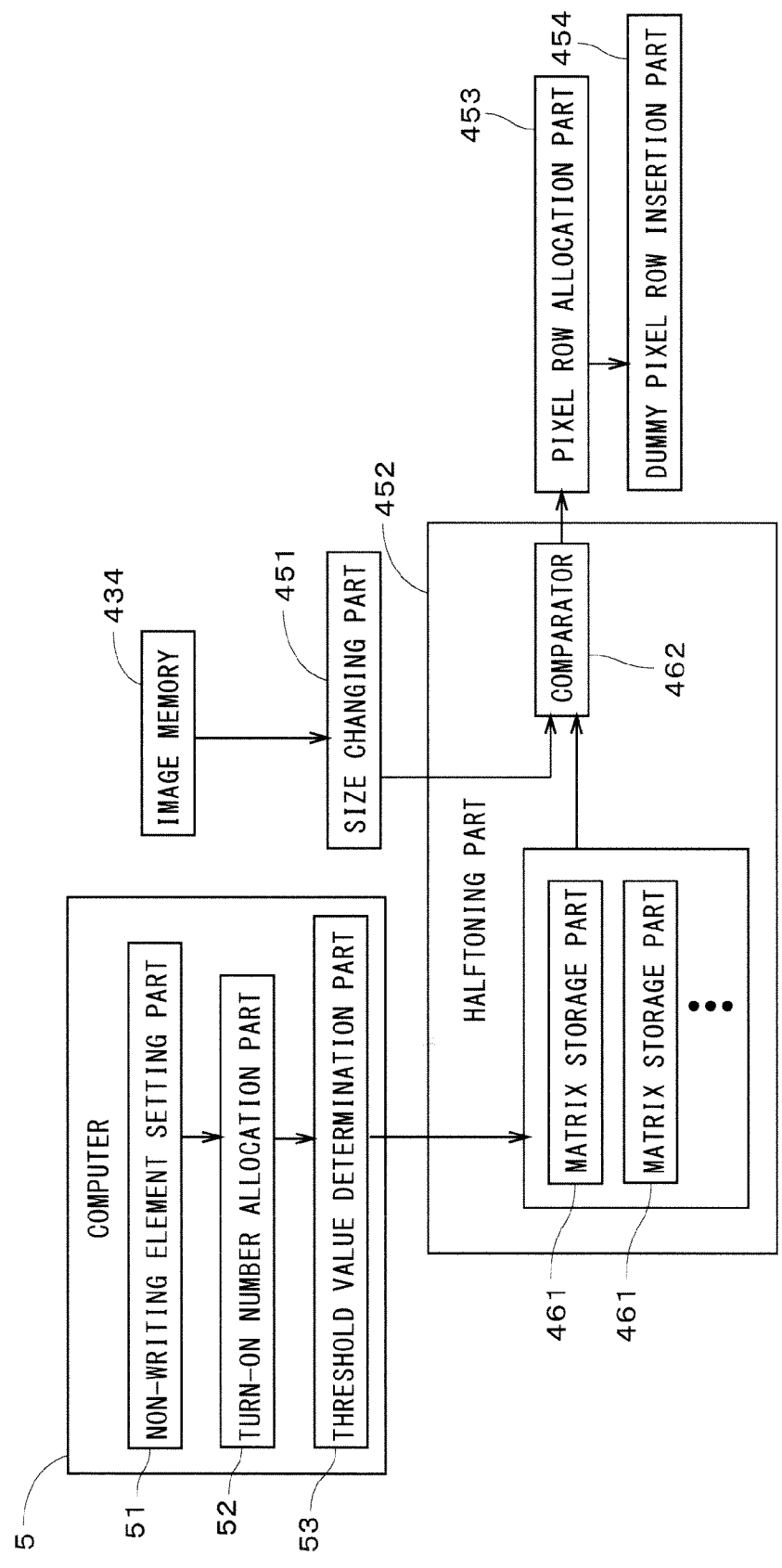
FIG. 19 is a block diagram showing a functional constitution of a halftoning part and that of a computer.
Figure 20:
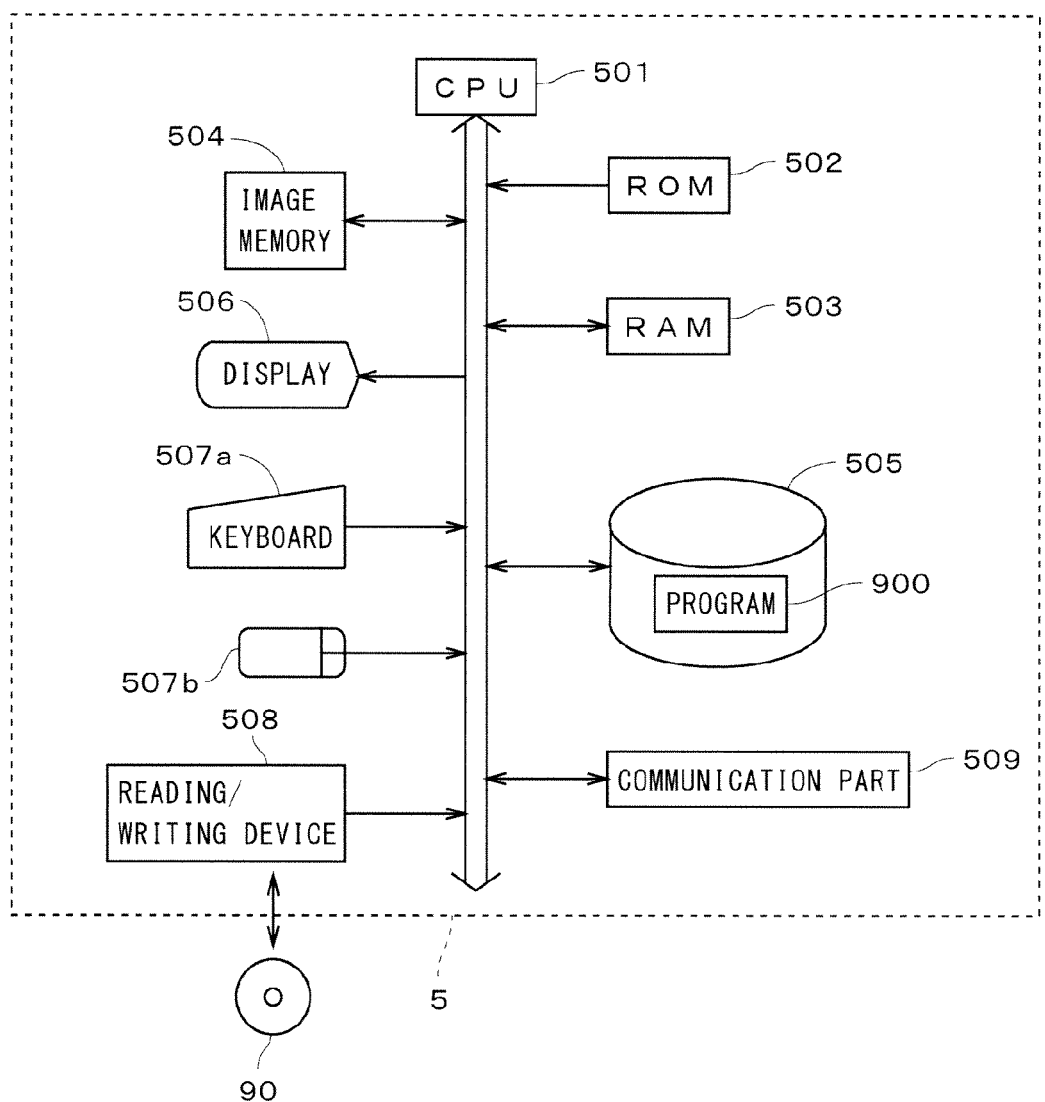
FIG. 20 is a view showing a constitution of the computer.

FIG. 19 is a block diagram showing a functional constitution of the halftoning part 452 and that of the computer 5 together with that of peripheral constituent elements. As a function of the computer 5, only constituent elements regarding the halftoning are shown. As shown in FIG. 20, the computer 5 has a constitution of general computer system where a CPU 501 for performing various computations, a ROM 502 for storing a basic program and a RAM 503 for storing various information are connected to a bus line. To the bus line, an image memory 504 for storing data of an original image of a color image to be halftoned, a fixed disk 505 for storing information, a display 506 for displaying various information, a keyboard 507a and a mouse 507b for receiving an input from the user, a reading/writing device 508 for reading information from a computer-readable recording medium 90 such as an optical disk, a magnetic disk, a magneto-optic disk, or the like and writing information into the recording medium 90, and a communication part 509 for making communication with the main body control part 4 and other devices are further connected through an interface (I/F), or the like, as appropriate.

In the computer 5, a program 900 is read out from, for example, a non-transitory recording medium 90 through the reading/writing device 508 and stored in the fixed disk 505 in advance. Then, the CPU 501 performs a computation according to the program 900 by using the RAM 503 and/or the fixed disk 505 as a work area (in other words, the computer 5 executes the program), to thereby cause the computer 5 to serve as a threshold matrix generation apparatus for generating a threshold matrix (also referred to as a dither matrix) to be used for halftoning of the original image. The threshold matrix and the data of the original image stored in the image memory 504 are transferred to the main body control part 4 through the communication part 509.

A non-writing element setting part 51, a turn-on number allocation part 52, and a threshold value determination part 53 shown in the computer 5 of FIG. 19 are functions implemented by the computer 5. On the other hand, the halftoning part 452 includes a plurality of matrix storage parts 461 (each referred to also as an SPM (Screen Pattern Memory)) which are memories for storing threshold matrices for a plurality of color components, respectively, and a comparator 462 (i.e. a halftoning circuit) for comparing the original image of multi-gradation with the threshold matrix for each color component.

These functions of the computer 5 may be implemented by dedicated electric circuits, or may be partially implemented by the dedicated electric circuits. Further, the functions of the image data processing part 431 including the halftoning part 452 may be also implemented by the computer, or may be implemented by using the dedicated electric circuits as appropriate. The same applies to other functional constitution of the main body control part 4.

Figure 21:
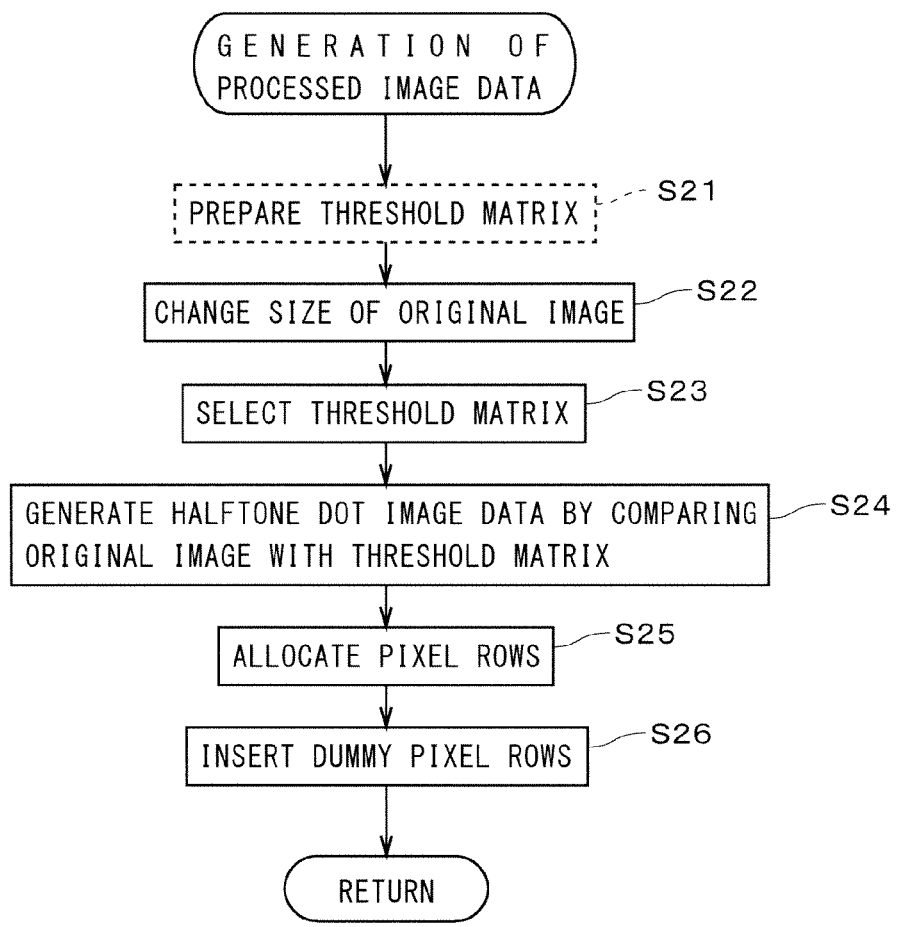
FIG. 21 is a flowchart showing an operation flow for generation of processed image data.

FIG. 21 is a flowchart showing an operation flow for generation of the processed image data, which is performed in Steps S12a and S12b in FIG. 4. In the halftoning part 452, the threshold matrices needed for the halftoning of the original image are stored in the matrix storage parts 461 in advance, being prepared (Step S21). The threshold matrices corresponding to the normal recording and each multiple-speed recording are prepared for each color component of the original image. Though the following description will be made with respect only to a threshold matrix for one color component, the same applies to threshold matrices for other color components.

As explained earlier, in the case of performing the normal writing, the size of the original image is not changed, and in the case of performing the N-fold-speed writing, the size of the original image is changed by the size changing part 451 (Step S22). Further, the threshold matrix corresponding to the changed size of the original image is selected (Step S23). The comparator 462 compares the original image with the selected threshold matrix, to thereby generate the halftone dot image data (Step S24). By using the original image with its size changed as necessary and the threshold matrix corresponding to the size of this original image, it is possible to reduce the amount of computation in the N-fold-speed writing.

Figure 22:
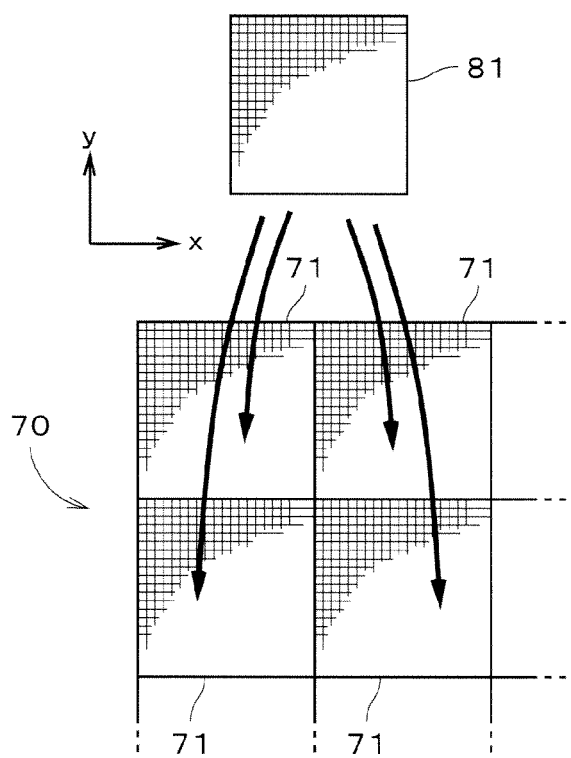
FIG. 22 is a view abstractly showing a threshold matrix and the original image.

FIG. 22 is a view abstractly showing a threshold matrix 81 and an original image 70. In the threshold matrix 81, a plurality of elements are arranged both in a row direction corresponding to the width direction (indicated as the x direction in FIG. 22) and in a column direction corresponding to the scan direction (recording direction) (indicated as the y direction in FIG. 22), and also in the original image 70, a plurality of pixels are arranged (the same applies to the halftone dot image explained later) both in a direction corresponding to the width direction (hereinafter, referred to as the "row direction" like in the threshold matrix 81) and in a direction corresponding to the scan direction (hereinafter, referred to as the "column direction" like in the threshold matrix 81). The original image is represented by, for example, tone values ranging from 0 to 255. As a matter of course, still more tone values may be used.

In order to halftone the original image 70, as shown in FIG. 22, set are repeat areas 71 obtained by dividing the original image 70 into a lot of areas having the same size, each of which is used as a unit of halftoning. In the case where the size of the original image 70 has been changed, the size of the repeat area 71 is also a changed one. Each of the matrix storage parts 461 has a storage area which corresponds to one repeat area 71 and stores the threshold matrix 81 by setting a threshold value to each address (coordinates) of this storage area. Then, conceptually, by superposing each repeat area 71 of the original image 70 on the selected threshold matrix 81 and comparing a pixel value of the color component of each pixel in the repeat area 71 with a corresponding threshold value of the threshold matrix 81, it is determined whether or not to perform writing (form a dot of the color) at a position of the pixel on the recording paper 9.

In an actual case, a pixel value of one pixel in the original image 70 is acquired on the basis of an address signal from an address generator included in the comparator 462 of FIG. 19. On the other hand, the address generator also generates an address signal indicating a position in the repeat area 71, which corresponds to the above pixel in the original image 70, and one threshold value in the threshold matrix 81 is thereby specified and read out from the matrix storage part 461. Then, the comparator 462 compares the pixel value with the threshold value from the matrix storage part 461, to thereby determine a pixel value in a binary halftone dot image (output image) at the position (address) of the pixel.

With respect to one color component, in the original image 70 of multi-gradation shown in FIG. 22, for example, a pixel value of "1" is given (in other words, a dot is placed) to a position whose pixel value is larger than the corresponding threshold value in the threshold matrix 81, and a pixel value of "0" is given (no dot is placed) to the other pixels. Thus, in the halftoning part 452, the original image 70 is halftoned by using the threshold matrices 81 and the halftone dot image data is thereby generated.

As explained earlier, the pixel row allocation part 453 allocates the halftone dot image data among respective pieces of data for the ejection port rows (Step S25) and the dummy pixel row insertion part 454 inserts dummy pixel rows into the preceding stage and the post-stage of the pixel rows as necessary, to thereby generate the processed image data (Step S26).

Next, with reference to FIGS. 23A and 23B, explanation will be made on a process of generating the threshold matrix. Herein, generation of the threshold matrices to be used for the double-speed writing and the normal writing will be explained as examples.

In the computer 5, a storage area corresponding to one repeat area 71 for the normal writing is prepared as a matrix space 80 (Step S31). The matrix space 80 is a set of matrix elements arranged both in the column direction corresponding to the recording direction in the image recording apparatus 1 and in the row direction perpendicular to the column direction. In each matrix element, one threshold value can be stored. The matrix space 80 with the threshold values set is the threshold matrix.

Figure 24:
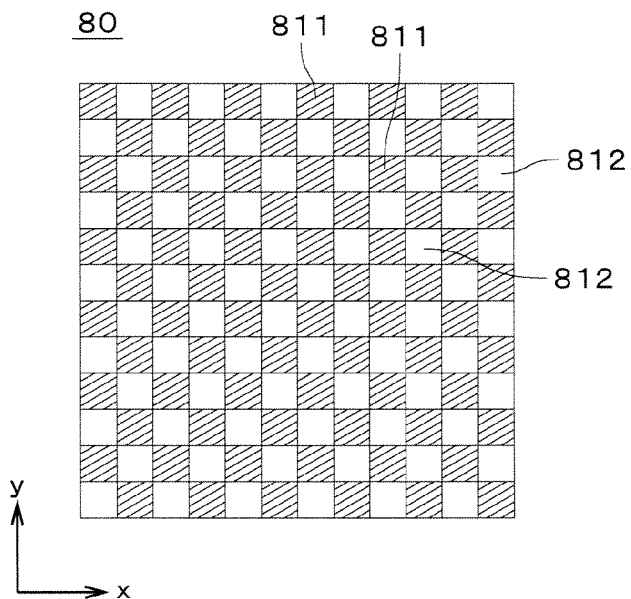
FIG. 24 is a view showing an arrangement of writing elements and non-writing elements.

The non-writing element setting part 51 sets non-writable positions on the recording paper 9 in the double-speed writing, i.e. matrix elements corresponding to writing positions at which no dot can be recorded, as non-writing elements (Step S32). In the exemplary case of FIG. 14, as shown in FIG. 24, the non-writing elements 812 are set at intervals of one element both in the column direction and in the row direction in a checkerboard-like manner. Hereinafter, hatched matrix elements other than the non-writing elements 812 are referred to as "writing elements 811". The process of preparing the matrix space 80 and the process of setting the non-writing elements 812 may be performed substantially concurrently.

Next, the turn-on number allocation part 52 allocates turn-on numbers to the writing elements 811. The turn-on number refers to a sequence number of a writing position of a dot which is turned on with an increase in the tone value of the original image. First, the turn-on number allocation part 52 allocates a first turn-on number to any one writing element 811 (Step S33). Hereinafter, the writing element whose turn-on number is determined (to which the turn-on number is allocated) is referred to as a "determined element" and the writing element whose turn-on number is not determined (to which any turn-on number is not allocated yet) is referred to as an "undetermined element".

Subsequently, by calculating an evaluation value of each undetermined element by using a predetermined evaluation function, one undetermined element which is farthest away from all the determined elements is specified and a next turn-on number is allocated to the undetermined element (Step S34). With this operation, this writing element 811 is changed to a determined element. At that time, in consideration of repetitive application of the threshold matrix 81 in performing halftoning of the original image 70 (see FIG. 22), calculation of the evaluation value is performed, assuming that determined elements are also present in the 8-neighbor matrix spaces 80 around the matrix space 80. The operation of Step S34 is repeated until all the writing elements 811 become the determined elements (Step S35).

Next, explanation will be made on an exemplary calculation of the evaluation value. In obtaining a writing element 811 to which an n-th turn-on number is to be allocated, an evaluation value $Ed_n$ (xd, yd) of an undetermined element indicated by coordinates (xd, yd) in the matrix space 80 can be obtained by using Eq. 3, where a number given to each of a central matrix space 80 and matrix spaces 80 assumed to be in the 8-neighbor of this matrix space 80 is represented as "r" and positions (coordinate values) in the x direction and the y direction of a determined element in the r-th matrix space 80, to which a m-th turn-on number is allocated, are "$xd_{mr}$" and "$yd_{mr}$", respectively. In Eq. 3, "m" and "r" each start from 0.

$$Ed_n(xd, yd) = \sum_{m=0}^{n-1} \sum_{r=0}^{8} \frac{1}{(xd - xd_{mr})^2 + (yd - yd_{mr})^2} \quad \text{(Eq. 3)}$$

In an actual case, in the evaluation function of Eq. 3, the position $xd_{mr}$ in the x direction of the m-th determined element in the r-th matrix space 80 is obtained by adding or subtracting a size of the matrix space 80 in the x direction to/from the position in the x direction of a corresponding determined element in the central matrix space 80 in accordance with a number given to the matrix space 80 (in other words, in accordance with a relative position with respect to the central matrix space 80), or as the same position as that position. The position $yd_{mr}$ in the y direction thereof is obtained by adding or subtracting a size of the matrix space 80 in the y direction to/from the position in the y direction of a corresponding determined element in the central matrix space 80 in accordance with a number given to the matrix space 80, or as the same position as that position.

After evaluation values of all the undetermined elements are calculated, a turn-on number of "n" is allocated to an undetermined element having the minimum evaluation value. Herein, in the evaluation function of Eq. 3, since the sum of reciprocals of the squares of distances between determined elements in the central matrix space 80 and the matrix spaces 80 assumed to be in the 8-neighbor of this matrix space 80 and an undetermined element in the central matrix space 80 is obtained as the evaluation value, an undetermined element having the minimum evaluation value is one farthest away from the determined elements, with the repetitive application of the threshold matrix 81 as a precondition.

A method of calculating the evaluation value is not limited to that indicated by Eq. 3. For example, there may be a method where the sum of distances from the determined elements is obtained as the evaluation value and a next turn-on number is allocated to an undetermined element having the maximum evaluation value. Further, a next turn-on number may be allocated to an undetermined element having the largest distance from the nearest determined element.

After the turn-on numbers are allocated to all the writing elements 811, the non-writing elements 812 are set as undetermined elements. Then, a next turn-on number is allocated to any one undetermined element and the undetermined element becomes a determined element (Step S41). Like in the case of the writing elements 811, an evaluation value of each undetermined element is obtained, and a next turn-on number is allocated to an undetermined element having the minimum evaluation value (Step S42). In other words, in consideration of repetitive application of the threshold matrix 81 in performing halftoning of the original image 70, a non-writing element 812 which is farthest away from all the determined elements is specified and a next turn-on number is allocated thereto.

Since the writing elements 811 are arranged uniformly in a checkerboard-like manner, in the computation of Step S42, the writing elements 811 which are determined elements may be treated as nontargets for the calculation of the evaluation value.

The operation of Step S42 is repeated until the turn-on numbers are allocated to all the non-writing elements 812 (Step S43). With this operation, the turn-on numbers are allocated to all the matrix elements. The arrangement of the obtained turn-on numbers is stored.

Next, the threshold value determination part 53 generates a threshold matrix for normal writing, i.e., for single speed (Step S44). In this process, the turn-on numbers for all the matrix elements are compressed to a range of the threshold values to be given to the matrix elements. The threshold value for each writing element 811 and the threshold value for each non-writing element 812 (the non-writing elements are also used for writing in the normal writing, however) are thereby determined. The threshold value is obtained, for example, by dividing the turn-on number by "the number of elements for which the threshold values should be set −1", then multiplying the quotient by "the number of tones −1", and rounding off the product. In a case where the number of tones is 256, any one integer from 0 to 255 is given as the threshold value.

When a tint image having gradation of 50% is halftoned by using the threshold matrix which is generated thus, writing is performed in a checkerboard-like manner.

The threshold value determination part 53 further generates a threshold matrix for double-speed writing (Step S45). In the generation of the threshold matrix for double speed, only the turn-on numbers for the writing elements 811 are compressed to the threshold values. With this operation, in accordance with the turn-on numbers, the threshold values only for the writing elements 811 are determined. Further, with omission of the non-writing elements 812, the remaining elements are closed in the row direction, and the matrix space is thereby shrunken to a half in the row direction (Step S46). As a result, obtained is a threshold matrix corresponding to the original image which is shrunken in Step S22 of FIG. 21. In the halftoning of Step S24, the shrunken original image is compared with the threshold matrix for double speed.

Data of the threshold matrix is recorded into an electronic device (including computer) readable/writable recording medium by the reading/writing device 508, and then the recording medium may be read by the main body control part 4, to store the data into the matrix storage part 461. Further, the recording medium may be read by another device, to generate a halftone dot image therein by using the threshold matrix.

Herein, comparative examination will be made on a case where a matrix space obtained by shrinking the matrix space for the normal writing to a half in the row direction is prepared as a matrix space for generation of the threshold matrix for double speed and threshold values are simply set to the matrix elements in the matrix space by using the above-mentioned evaluation values. In other words, in a matrix space having a half size, a threshold value is determined by allocating a next turn-on number to an undetermined element which is farthest away from the determined elements.

Figure 25A:
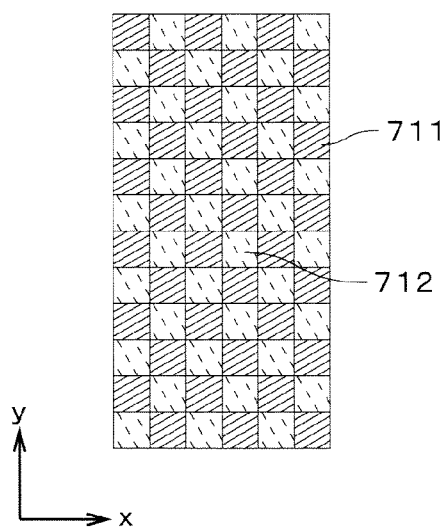
FIG. 25A is a view showing a comparative example in which a shrunken original image is halftoned.

In this case, when an original image having gradation of 50% is shrunken in the row direction and then halftoned, pixels 711 in each of which a dot is written and pixels 712 in each of which no dot is written are arranged in a checkerboard-like manner as shown in FIG. 25A. Since this halftone dot image is shrunken to a half in the row direction, however, in an actual recording, this halftone dot image is recorded, being extended to double in the row direction, with non-writing pixels 713 inserted therein, as shown in FIG. 25B.

Figure 25B:
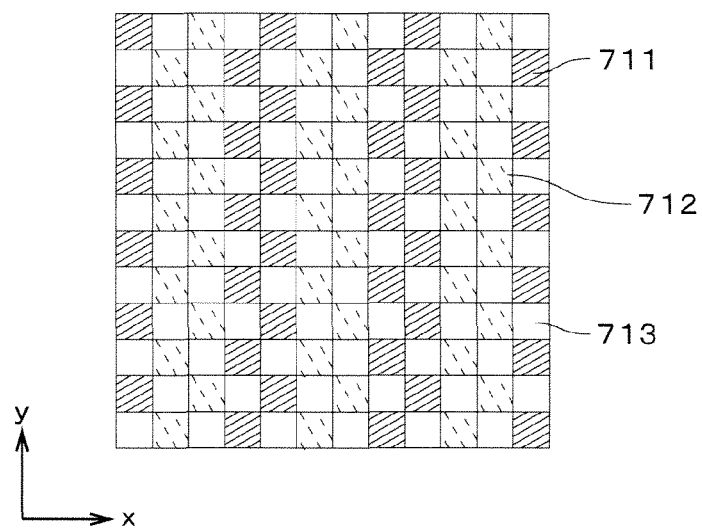
FIG. 25B is a view showing a halftone dot image recorded with dots deviated.

As can be clearly seen from FIG. 25B, the pixels 711 in each of which a dot is written are unevenly distributed, and an image in which lines are present is recorded as the tint image having gradation of 50%. On the other hand, since the threshold matrix for double speed used in the image recording apparatus 1 has the threshold values which are set with the presence of the non-writing elements 812 as a precondition, it is possible to achieve an excellent discrete state of writing dots and prevent such deviation as above.

Figure 23A:
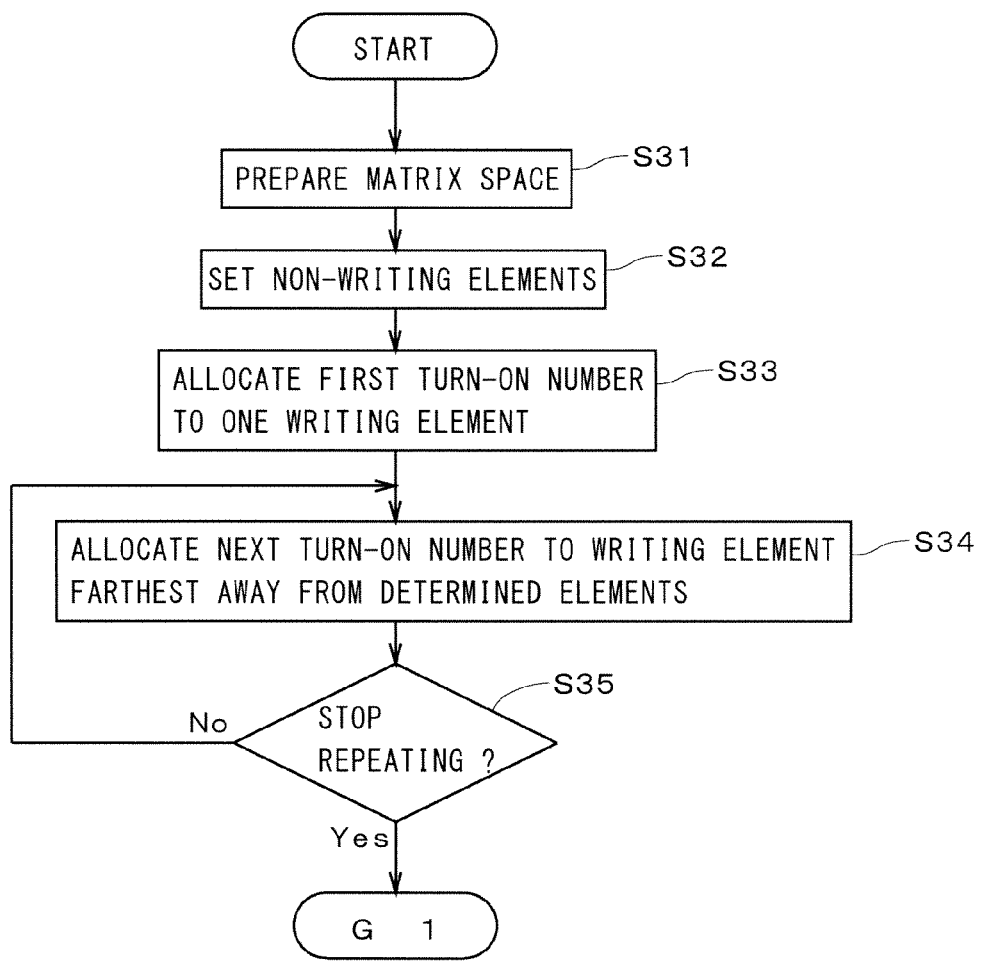
FIGS. 23A and 23B are flowcharts showing an operation flow for generating the threshold matrix.
Figure 23B:
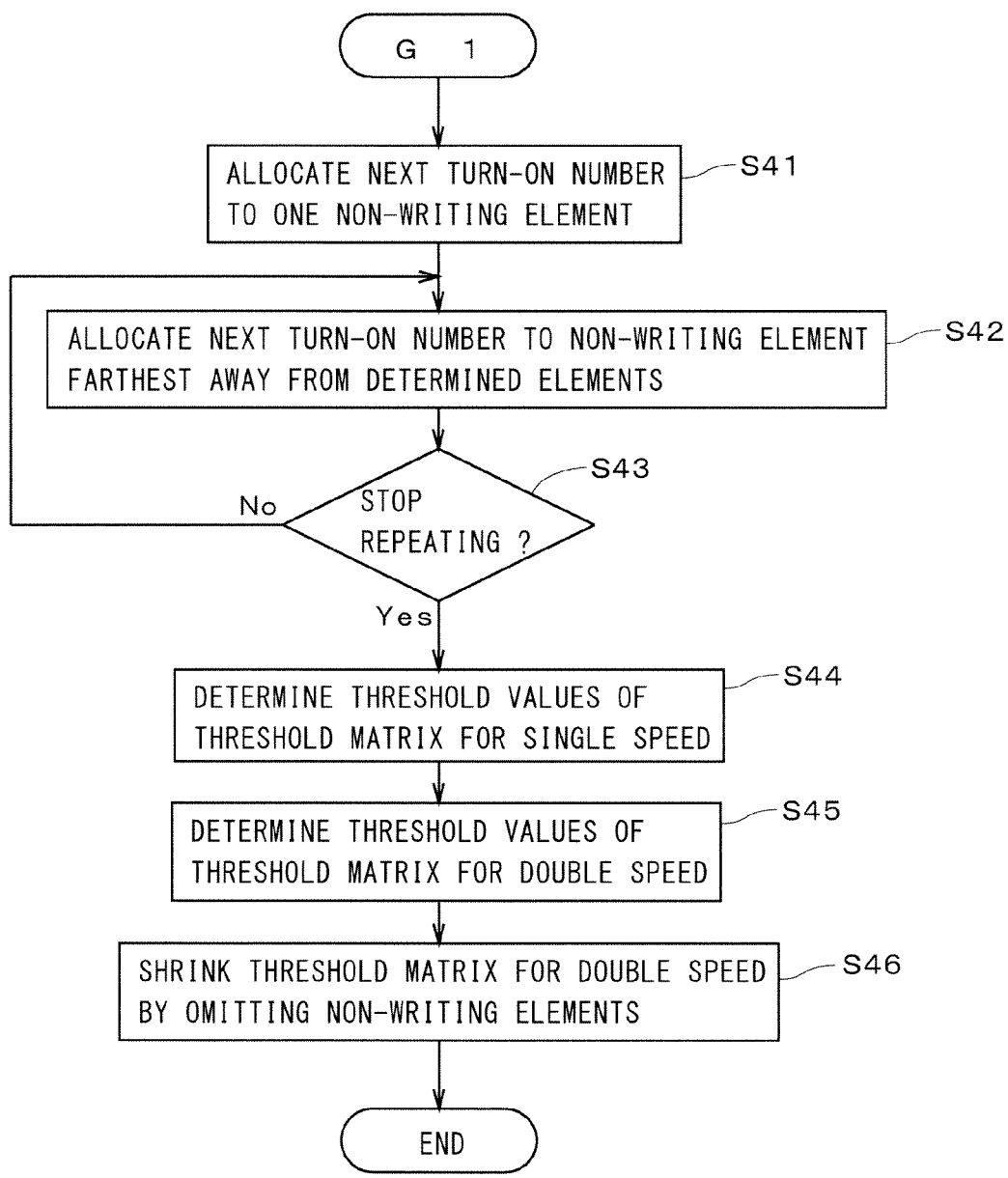

Further, since the threshold matrix for normal writing is generated by allocating the turn-on numbers to the non-writing elements 812 in Step S42 of FIG. 23B, it is possible to quickly obtain the threshold matrix for normal writing by using the process of generating the threshold matrix for double speed.

Figure 26:
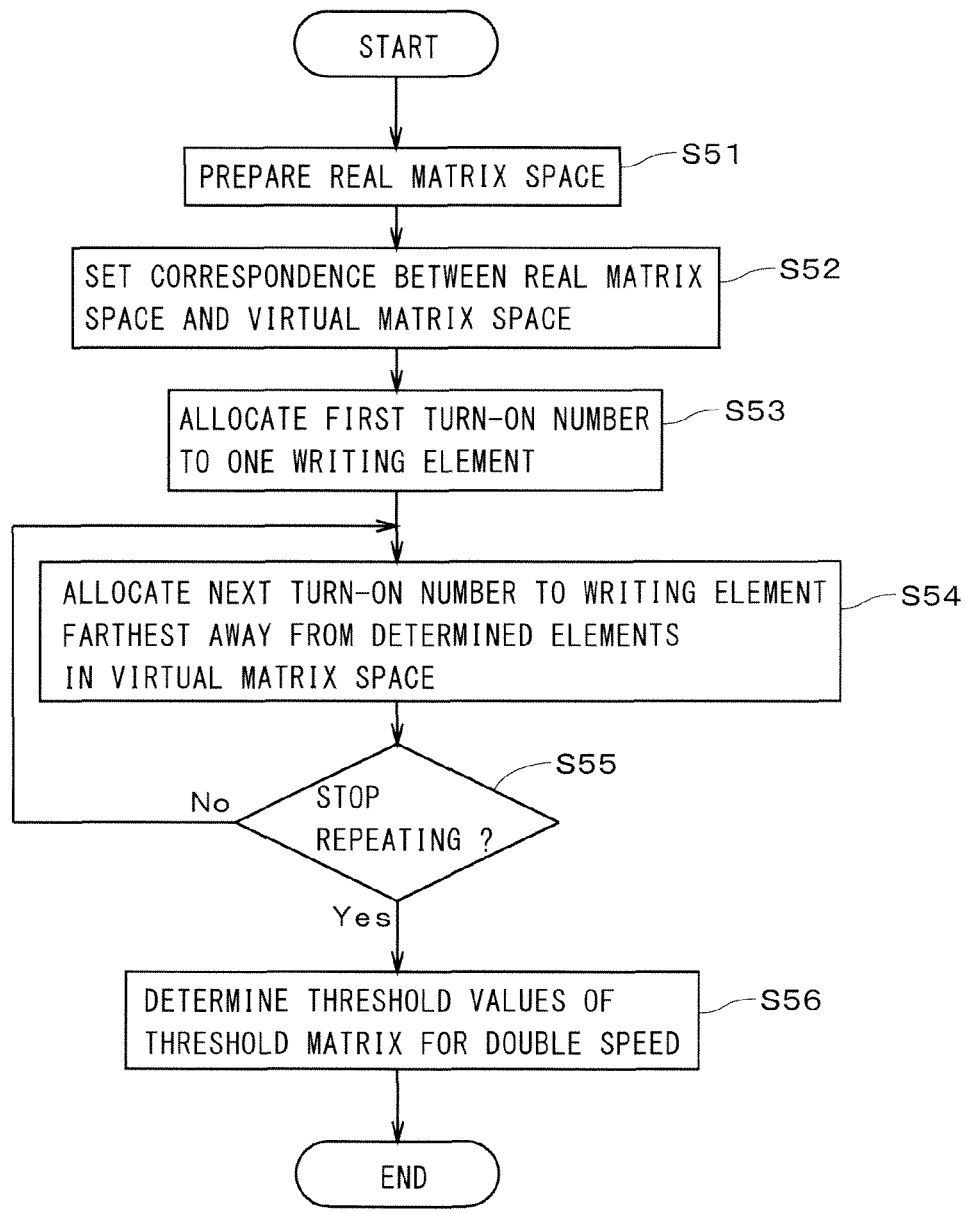
FIG. 26 is a flowchart showing another operation of generating a threshold matrix for double speed.

FIG. 26 is a flowchart showing another operation of generating a threshold matrix for double speed. In FIG. 26, first, as a real matrix space, prepared is a space obtained by omitting the non-writing elements from the matrix space for normal writing to shrink the matrix space to a half in the row direction (Step S51). The real matrix space refers to a memory space which is set in a memory device as the matrix storage part 461. Next, the non-writing element setting part 51 sets a correspondence between the matrix space shown in FIG. 24 and the real matrix space (Step S52). The matrix space shown in FIG. 24 is not actually prepared. Hereinafter, the matrix space shown in FIG. 24 which is virtually set will be referred to as a "virtual matrix space". By setting the correspondence between the real matrix space and the virtual matrix space, substantially, the non-writing elements 812 are set in the virtual matrix space. The correspondence between the real matrix space and the virtual matrix space may be prepared before the real matrix space is prepared, and in this case, it may be considered that the preparation of the real matrix space and setting of the non-writing elements are performed concurrently.

All the matrix elements in the real matrix space correspond to the writing elements 811 in the virtual matrix space. The turn-on number allocation part 52 allocates the first turn-on number to one writing element in the real matrix space (Step S53). Then, the turn-on number allocation part 52 allocates a next turn-on number to an undetermined element which is farthest away from the determined elements, like in Step S34 of FIG. 23A, with conversion of coordinates of the matrix elements in the real matrix space into coordinates in the virtual matrix space (Step S54).

Specifically, when an undetermined element for which an evaluation value is to be obtained is positioned in an odd-numberth line, coordinates (x, y) in the real matrix space are converted into coordinates (2x−1, y) in the virtual matrix space. The coordinates x and y in row and column each start from 0. When an undetermined element is positioned in an even-numberth line, coordinates (x, y) in the real matrix space are converted into coordinates (2x, y) in the virtual matrix space. With such coordinate conversion performed on the undetermined element and the determined elements, the evaluation value in the virtual matrix space for each undetermined element is obtained.

By preparing a conversion table in advance, the operation of converting the coordinates in the real matrix space into the coordinates in the virtual matrix space may be performed by referring to this conversion table. It is thereby possible to quickly perform the coordinate conversion.

By repeating the calculation of the evaluation values in the virtual matrix space and the allocation of the turn-on numbers to the writing elements in the real matrix space until no undetermined element is present (Step S55), the turn-on numbers are allocated to all the writing elements in the real matrix space. By using the virtual matrix space, it is possible to reduce the memory capacity required for the computation.

After that, the turn-on numbers are compressed into a range of the tone values, and the threshold value for each matrix element is thereby set (Step S56). The threshold matrix which is thus generated is the same as that generated in Step S45 of FIG. 23B if the position in the virtual matrix space corresponding to the writing element to which the first turn-on number is allocated is the same as that in Step S33 of FIG. 23A. In the case of adopting the method shown in FIG. 26, the threshold matrix for normal writing is generated separately.

Figure 27:
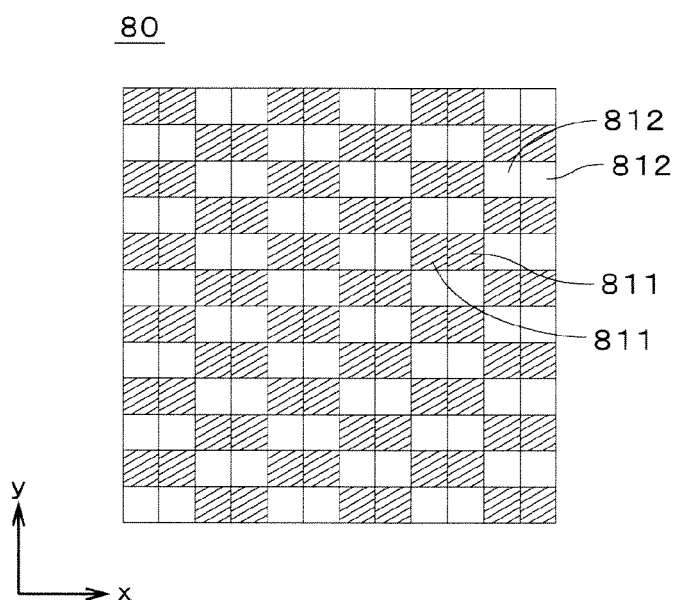
FIG. 27 is a view showing another exemplary threshold matrix for double speed.

FIG. 27 is a view showing another exemplary matrix space 80 which is prepared in the generation of the threshold matrix for double speed. In the matrix space 80 of FIG. 27, each writing element 811 is disposed at intervals of one element in the column direction and each two writing elements 811 are disposed at intervals of two elements in the row direction. Thus, with respect to the row direction, two writing elements 811 are continuously disposed. In the image recording apparatus 1, such an arrangement of the non-writing elements 812 is sometimes used for the generation of the threshold matrix.

In general expression, in the case where image recording is performed at N-fold speed, one writing element 811 is disposed at intervals of (N−1) elements in the column direction and one writing element 811 is disposed at intervals of (N−1) elements or two writing elements 811 are disposed at intervals of (2N−2) elements in the row direction. The other matrix elements are set as the non-writing elements 812. The method of determining the threshold value in this case is the same as the method shown in FIGS. 23A and 23B or the method shown in FIG. 26. It is thereby possible to achieve an excellent discrete state of writing dots even in high-speed image recording.

Also in the N-fold-speed writing, the non-writing elements 812 are set corresponding to the non-writable positions on the recording paper 9. In a case where each ejection port row can perform the ejection operation at any timing, however, the non-writing elements 812 are not limited to the non-writable positions and the above N is not limited to the submultiple of the number of ejection port rows. In this case, N can be set to be any integer not less than 2. The recording speed of the image recording apparatus 1 and the arrangement of the writing elements 811 and the non-writing elements 812 in the threshold matrix are variously changeable in accordance with the value of N.

Though the constitution and operation of the image recording apparatus 1 and the generation of the threshold matrix have been described above, these allow various variations.

Though a plurality of ejection port rows are arranged in the head part 23 and the ejection operations of all the ejection ports are performed concurrently at a constant cycle in each ejection port row, to thereby achieve easy high-speed recording of high-precision images in the above-mentioned preferred embodiment, in the image recording apparatus, one ejection port row having a plurality of ejection ports each of which repeats the ejection operations at the basic cycle and can individually change its ejection timing may be provided.

Even in such an image recording apparatus, in the case where the recording paper 9 is moved in the scan direction at normal speed, the normal writing is performed where each of a plurality of ejection ports arranged at a constant pitch in the width direction performs the ejection operation onto the writing positions which are present at a constant writing pitch on the recording paper 9 in the scan direction. Similarly, in the case where the recording paper 9 is moved in the scan direction at N times the normal speed (N: at least one integer not less than 2), the N-fold-speed writing is performed where in each ejection port group in which N ejection ports are continuously present in the width direction among a plurality of ejection ports, the ejection ports included in each ejection port group sequentially perform the ejection operations onto the writing positions which are present at a constant writing pitch on the recording paper 9 in the scan direction, to thereby write dots at the positions in the scan direction with the positions in the scan direction at which the ejection ports in each ejection port group write dots being shifted. It is thereby possible to record high-precision images on the recording paper 9 at high speed.

Further, in the case where the ejection ports are arranged at a constant pitch in the width direction by virtue of the plurality of ejection port rows 251 to 254 arranged in the scan direction, like in the above-mentioned preferred embodiment, in the N-fold-speed writing, the order of performing the ejection operations onto the same writing position block is the same in each ejection port group including the plurality of ejection ports 241. Also in the case where only one ejection port row is provided in the head part, however, it is preferable that the order of the ejection ports which perform the ejection operations in the N-fold-speed writing should be the same in each ejection port group including the plurality of ejection ports, and it thereby becomes possible to easily control the ejection operations of the plurality of ejection ports.

In the image recording apparatus 1 shown in FIG. 1, the column interval W among the ejection port rows 251 to 254 in the head part 23 is a distance obtained by multiplying an integral multiple of any one submultiple N (except "1") of the number of ejection port rows which is selectable as the selected multiple speed value by the writing pitch K (in other words, an integral multiple of the center distance between the writing positions (N times the writing pitch K) assuming that a resolution $D_r$ in the scan direction is 1/N), and by shifting the phase of the timing of the ejection operation by 360°/N in N ejection port rows in which N ejection ports 241 are continuously present in the width direction, it is possible to easily control the ejection operations.

On the other hand, for example, in the case where the ejection port rows are arranged being inclined with respect to the width direction, or the like, the phase of timing of the ejection operation may be changed for each ejection port (the same applies to the normal writing). In other words, if each ejection port repeats the ejection operation at the basic cycle, the control over the ejection operations in the plurality of ejection ports may be performed in various manners.

Further, in the image recording apparatus 1, by considering also a speed obtained by multiplying the normal speed (the normal speed determined with respect to the head part 23 in advance) by $\alpha$ or $1/\beta$ ($\alpha$, $\beta$: positive integer) as the normal speed within a range where a value obtained by dividing the column interval W by the distance of the relative movement of the head part 23 with respect to the recording paper 9 during the basic cycle is an integer, the N-fold-speed writing may be performed with normal writings corresponding to various normal speeds as references.

Though the dots are continuously disposed in a direction inclined with respect to both the width direction and the scan direction in the exemplary case of high-speed writing at quadruple speed shown in FIG. 17, if dots are written at the writing positions which are present at intervals of three writing positions both in the width direction and in the scan direction (i.e. the writing positions away from one another both in the width direction and in the scan direction by the distance which corresponds to four writing positions), the arrangement of the writing positions at which dots are written may be changed in various manners.

Further, in the image recording apparatus 1, the original image data corresponding to the recorded image shown in FIG. 15 (or the recorded image shown in FIG. 18) is prepared, and the processed image data for high-speed writing may be generated from the original image data.

In an image recording apparatus, the head part 23 may perform main scan and subscan with respect to the recording paper 9, to thereby perform recording. In an image recording apparatus in which the width where a plurality of ejection ports are arranged in the width direction is narrower than that of the recording area of the recording paper 9 and a scanning mechanism which relatively moves the head part 23 with respect to the recording paper 9 both in the scan direction and in the width direction is provided, the head part 23 relatively moves (performs main scan) in the scan direction while ejecting ink, relatively moves (performs subscan) in the width direction by a predetermined distance after reaching the end of the recording paper 9, and then relatively moves in the reverse direction of the immediately preceding main scan in the scan direction while ejecting ink. Thus, the head part 23 performs main scan with respect to the recording paper 9 in the scan direction and every time when the main scan is completed, the head part 23 intermittently performs subscan in the width direction, to thereby record an image on the entire recording paper 9. The image recording in this case may be performed by interlace scanning in which an area which has been once scanned is further scanned, or may be performed by one-pass scanning in which an area which has been once scanned is not scanned again.

It is preferable, however, that the technique for recording high-precision images on the recording paper 9 at high speed, which has been explained in the above preferred embodiment, should be adopted in a high-speed image recording apparatus in which the plurality of ejection ports included in the head part 23 are arranged entirely over the recording area on the recording paper 9 in the width direction and recording is completed by one pass of the recording paper 9 below the head part 23 (i.e., one-pass processing). It is thereby possible to record images on the recording paper 9 in a shorter time.

Though the recording paper 9 is moved with respect to the head part 23 in the scan direction by virtue of the moving mechanism 3 which moves a recording object in the image recording apparatus 1, a moving mechanism which moves the head part 23 in the Y direction may be provided. There may be another case where the recording paper 9 is a piece of sheet and pieces of recording paper 9 are sequentially transferred. Thus, a scanning mechanism for relatively moving the recording paper 9 with respect to the head part 23 in the scan direction at a constant normal speed or N times the normal speed can be achieved with various configurations.

Further, in the image recording apparatus 1, ejection of ink of multi-gradation (for example, formation of dots having different sizes) may be performed. In such a case, submatrices for dots having various sizes are generated and a set of the submatrices is prepared as a threshold matrix in accordance with the writing speed.

The recording object used in the image recording apparatus 1 may be a film or the like other than the recording paper 9.

The threshold matrix used in the above-mentioned preferred embodiment may be used in other image recording apparatuses involved in creation of printed matters, such as an electrophotographic printer, a plate making apparatus for CTP (Computer To Plate), or the like. Thus, the threshold matrix explained in the above preferred embodiment can be used in various image recording apparatuses which include a head having a plurality of dot output elements for writing dots at a plurality of writing positions, respectively, which are arranged on a recording object in the width direction perpendicular to a predetermined scan direction and a moving mechanism for relatively moving the plurality of writing positions on the recording object with respect to the object in the scan direction.

Though the main body control part 4 serves as an image data generation apparatus for generating image data in the above-mentioned preferred embodiment, a function of the image data generation apparatus may be provided separately from the main body 10. Further, the halftone dot image data may be used for various purposes other than printing, such as display of images on display devices, or the like.

Though the original image is shrunken in the row direction and the threshold matrix in conformity with the shrunken original image is used in the case of image recording at N-fold speed in the above-mentioned preferred embodiment, the original image which is not shrunken may be halftoned. In such a case, a threshold matrix including the non-writing elements is used.

Further, in obtaining the evaluation values for the undetermined elements, weighting may be performed in accordance with not only the distance from the determined elements but also directions of the positions of the determined elements. Furthermore, obtaining the turn-on number by using the evaluation value is substantially the same as obtaining a turn-off number by using the evaluation value. For example, in the order of the turn-on numbers obtained in the above-mentioned preferred embodiment, writing positions at which no dot is written with a decrease in the tone value from the maximum value may be determined.

In the operation shown in FIGS. 23A and 23B, only the threshold matrix for double speed may be generated. In other words, only Steps S31 to 35, S45, and S46 may be performed.

The generation of the threshold matrix in consideration of the non-writing elements may be used in various apparatuses which have limitation on writing positions, and is not limited to the use in the apparatus having the head parts explained in the above preferred embodiment.

The configurations of the above-described preferred embodiment and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention. This application claims priority benefit under 35 U.S.C. Section 119 of Japanese Patent Application No. 2013-069169 filed in the Japan Patent Office on Mar. 28, 2013, the entire disclosure of which is incorporated herein by reference.

REFERENCE SIGNS LIST

1 Image recording apparatus
3 Moving mechanism
5 Computer
9 Recording paper (Recording object)
23 Head part
41 Drive mechanism control part
42 Timing control part
44 General control part
70 Original image
80 Matrix space
81 Threshold matrix
431 Image data processing part
432 Head control part
452 Halftoning part
461 Matrix storage part
811 Writing element
812 Non-writing element
900 Program

The invention claimed is:

1. A threshold matrix generation method of generating a threshold matrix to be compared with an original image of multi-gradation in performing halftoning of said original image in an image recording apparatus which is capable of recording an image at single speed and at N-fold speed where N is an integer not less than 2, comprising:

a) preparing a matrix space which is a set of matrix elements arranged both in a column direction which corresponds to a recording direction in said image recording apparatus and in a row direction perpendicular to said column direction;

b) setting writing elements which are matrix elements corresponding to writing positions on a recording object so that one writing element is positioned at intervals of (N−1) matrix elements in said column direction and one writing element is positioned at intervals of (N−1) matrix elements or two writing elements are positioned at intervals of (2N−2) matrix elements in said row direction in a whole of said matrix space and setting the other matrix elements as non-writing elements always evenly in the whole area of said matrix space in said operation a) or after said operation a);

c) giving the first turn-on number to one writing element, being thereafter changed to a determined element, and then repeating a process of specifying a writing element which is farthest away from all determined elements and giving a next turn-on number to said writing element, being thereafter changed to a determined element, in consideration of repetitive application of said threshold matrix in performing halftoning of an original image, to thereby allocate turn-on numbers to all writing elements; and d) obtaining a threshold matrix for N-fold speed by determining a threshold value of each writing element in accordance with said turn-on numbers.

2. The threshold matrix generation method according to claim 1, wherein said N is 2.

3. The threshold matrix generation method according to claim 1, further comprising:

after said operation c), e) giving a turn-on number next to the turn-on number to one non-writing element, being thereafter changed to a determined element, and then repeating a process of specifying a non-writing element which is farthest away from all determined elements and giving a next turn-on number to said non-writing element, being thereafter changed to a determined element, in consideration of repetitive application of said threshold matrix in performing halftoning of said original image, to thereby allocate turn-on numbers also to all non-writing elements; and f) obtaining a threshold matrix for single speed by determining a threshold value of each writing element and each non-writing element in accordance with said turn-on numbers.

4. The threshold matrix generation method according to claim 1, further comprising:

shrinking said threshold matrix for N-fold speed in said row direction by omitting said non-writing elements after said operation d).

5. The threshold matrix generation method according to claim 1, wherein said matrix space is a virtual matrix space which is virtually set, a matrix space which is said virtual matrix space shrunken in said row direction by omitting said non-writing elements is a real matrix space to be set in a memory device, and said operation c) is executed with conversion of coordinates of said real matrix space into coordinates of said virtual matrix space.

6. An image data generation method of generating image data in an image recording apparatus which is capable of recording an image at single speed and at N-fold speed where N is an integer not less than 2, comprising:

preparing a threshold matrix; and generating halftone dot image data in which an original image of multi-gradation is halftoned, by comparing said original image with said threshold matrix, wherein said operation of preparing said threshold matrix comprises:

a) preparing a matrix space which is a set of matrix elements arranged both in a column direction which corresponds to a recording direction in said image recording apparatus and in a row direction perpendicular to said column direction;

b) setting writing elements which are matrix elements corresponding to writing positions on a recording object so that one writing element is positioned at intervals of (N−1) matrix elements in said column direction and one writing element is positioned at intervals of (N−1) matrix elements or two writing elements are positioned at intervals of (2N−2) matrix elements in said row direction in a whole area of said matrix space and setting the other matrix elements as non-writing elements always evenly in the whole area of said matrix space in said operation a) or after said operation a);

c) giving the first turn-on number to one writing element, being thereafter changed to a determined element, and then repeating a process of specifying a writing element which is farthest away from all determined elements and giving a next turn-on number to said writing element, being thereafter changed to a determined element, in consideration of repetitive application of said threshold matrix in performing halftoning of an original image, to thereby allocate turn-on numbers to all writing elements; and d) obtaining a threshold matrix for N-fold speed by determining a threshold value of each writing element in accordance with said turn-on numbers.

7. The image data generation method according to claim 6, wherein said N is 2.

8. The image data generation method according to claim 6, wherein said operation of preparing said threshold matrix further comprises:

after said operation c), e) giving a turn-on number next to the turn-on number to one non-writing element, being thereafter changed to a determined element, and then repeating a process of specifying a non-writing element which is farthest away from all determined elements and giving a next turn-on number to said non-writing element, being thereafter changed to a determined element, in consideration of repetitive application of said threshold matrix in performing halftoning of said original image, to thereby allocate turn-on numbers also to all non-writing elements; and f) obtaining a threshold matrix for single speed by determining a threshold value of each writing element and each non-writing element in accordance with said turn-on numbers.

9. The image data generation method according to claim 6, wherein said operation of preparing said threshold matrix further comprises:

shrinking said threshold matrix for N-fold speed in said row direction by omitting said non-writing elements after said operation d).

10. The image data generation method according to claim 6, wherein said matrix space is a virtual matrix space which is virtually set, a matrix space which is said virtual matrix space shrunken in said row direction by omitting said non-writing elements is a real matrix space to be set in a memory device, and said operation c) is executed with conversion of coordinates of said real matrix space into coordinates of said virtual matrix space.

11. An image recording apparatus capable of recording an image at single speed and at N-fold speed where N is an integer not less than 2, comprising:

a head part having a plurality of dot output elements for writing dots into a plurality of writing positions, respectively, which are arranged in a width direction perpendicular to a recording direction on a recording object;

a moving mechanism for relatively moving said plurality of writing positions on said recording object with respect to said recording object in said recording direction;

a storage part for storing a threshold matrix;

an image data processing part for generating halftone dot image data in which an original image of multi-gradation is halftoned, by comparing said original image with said threshold matrix; and a control part for controlling outputs of said plurality of dot output elements on the basis of said halftone dot image data concurrently with a relative movement of said plurality of writing positions on said recording object with respect to said recording object, wherein said threshold matrix is generated by the operations of:

a) preparing a matrix space which is a set of matrix elements arranged both in a column direction which corresponds to a recording direction in said image recording apparatus and in a row direction perpendicular to said column direction;

b) setting writing elements which are matrix elements corresponding to writing positions on a recording object so that one writing element is positioned at intervals of (N−1) matrix elements in said column direction and one writing element is positioned at intervals of (N−1) matrix elements or two writing elements are positioned at intervals of (2N−2) matrix elements in said row direction in a whole area said matrix space and setting the other matrix elements as non-writing elements always evenly in the whole area of said matrix space in said operation a) or after said operation a);

c) giving the first turn-on number to one writing element, being thereafter changed to a determined element, and then repeating a process of specifying a writing element which is farthest away from all determined elements and giving a next turn-on number to said writing element, being thereafter changed to a determined element, in consideration of repetitive application of said threshold matrix in performing halftoning of an original image, to thereby allocate turn-on numbers to all writing elements; and d) obtaining a threshold matrix for N-fold speed by determining a threshold value of each writing element in accordance with said turn-on numbers.

12. The image recording apparatus according to claim 11, wherein said non-writing elements correspond to non-writable positions on said recording object in recording an image at N-fold speed.

13. The image recording apparatus according to claim 11, wherein said head part passes only once over each position on said recording object, to thereby record an image.

14. A non-transitory computer-readable recording medium recorded therein a program to cause a computer to generate a threshold matrix to be compared with an original image of multi-gradation in performing halftoning of said original image in an image recording apparatus which is capable of recording an image at single speed and at N-fold speed where N is an integer not less than 2, said program being executed by a computer to cause said computer to perform the operations of:
a) preparing a matrix space which is a set of matrix elements arranged both in a column direction which corresponds to a recording direction in said image recording apparatus and in a row direction perpendicular to said column direction;
b) setting writing elements which are matrix elements corresponding to writing positions on a recording object so that one writing element is positioned at intervals of (N−1) matrix elements in said column direction and one writing element is positioned at intervals of (N−1) matrix elements or two writing elements are positioned at intervals of (2N−2) matrix elements in said row direction in a whole area of said matrix space and setting the other matrix elements as non-writing elements always evenly in the whole area of said matrix space in said operation a) or after said operation a);
c) giving the first turn-on number to one writing element, being thereafter changed to a determined element, and then repeating a process of specifying a writing element which is farthest away from all determined elements and giving a next turn-on number to said writing element, being thereafter changed to a determined element, in consideration of repetitive application of said threshold matrix in performing halftoning of an original image, to thereby allocate turn-on numbers to all writing elements; and
d) obtaining a threshold matrix for N-fold speed by determining a threshold value of each writing element in accordance with said turn-on number.

15. The recording medium according to claim 14, wherein said N is 2.

16. The recording medium according to claim 14, wherein said program is executed by said computer to cause said computer to further perform the operations of:
after said operation c),
e) giving a turn-on number next to the turn-on number to one non-writing element, being thereafter changed to a determined element, and then repeating a process of specifying a non-writing element which is farthest away from all determined elements and giving a next turn-on number to said non-writing element, being thereafter changed to a determined element, in consideration of repetitive application of said threshold matrix in performing halftoning of said original image, to thereby allocate turn-on numbers also to all non-writing elements; and
f) obtaining a threshold matrix for single speed by determining a threshold value of each writing element and each non-writing element in accordance with said turn-on numbers.

17. The recording medium according to claim 14, wherein said program is executed by said computer to cause said computer to further perform the operation of:
shrinking said threshold matrix for N-fold speed in said row direction by omitting said non-writing elements after said operation d).

18. The recording medium according to claim 14, wherein said matrix space is a virtual matrix space which is virtually set,
a matrix space which is said virtual matrix space shrunken in said row direction by omitting said non-writing elements is a real matrix space to be set in a memory device, and
said operation c) is executed with conversion of coordinates of said real matrix space into coordinates of said virtual matrix space.

\* \* \* \* \*